United States Patent [19]

Ishida et al.

[11] Patent Number: 5,220,375
[45] Date of Patent: Jun. 15, 1993

[54] CAMERA HAVING BLURRING CORRECTION APPARATUS

[75] Inventors: Tokuji Ishida; Masataka Hamada; Eiji Yamakawa; Hiromu Mukai; Hisayuki Masumoto; Takashi Okada; Takehiro Katoh; Hiroshi Ootsuka, all of Osaka, Japan

[73] Assignee: Minolta Camera Kabushiki Kaisha, Osaka, Japan

[21] Appl. No.: 817,978

[22] Filed: Jan. 8, 1992

Related U.S. Application Data

[63] Continuation of Ser. No. 540,776, Jun. 20, 1990, abandoned.

[30] Foreign Application Priority Data

Jun. 21, 1989 [JP] Japan .................. 1-160512

[51] Int. Cl.$^5$ .................. G03B 5/00; G03B 15/03; G03B 7/093
[52] U.S. Cl. .................. 354/419; 354/420; 354/430; 354/456; 354/286
[58] Field of Search .................. 354/430, 413, 419, 420, 354/422, 70, 75, 76, 202, 289.1, 289.12, 407, 456, 286; 359/554–557; 358/222

[56] References Cited

U.S. PATENT DOCUMENTS

| 3,455,221 | 7/1969 | Reekie .................. 350/500 |
| 3,805,278 | 4/1974 | Matsuzaki et al. .................. 354/420 |
| 4,780,739 | 10/1988 | Kawakami et al. .................. 354/430 |
| 4,788,596 | 11/1988 | Kawakami et al. .................. 358/222 |
| 4,847,680 | 7/1989 | Okino .................. 354/430 X |
| 4,965,619 | 10/1990 | Shikaumi et al. .................. 354/430 X |
| 4,970,540 | 11/1990 | Vasey et al. .................. 354/202 |
| 5,060,007 | 10/1991 | Egawa .................. 354/430 |
| 5,065,232 | 11/1991 | Kondo .................. 354/430 X |
| 5,084,724 | 1/1992 | Maeno .................. 354/430 |
| 5,095,198 | 3/1992 | Nakazawa et al. .................. 354/407 X |
| 5,101,230 | 3/1992 | Shikaumi et al. .................. 354/430 |
| 5,103,254 | 4/1992 | Bell et al. .................. 354/430 X |

FOREIGN PATENT DOCUMENTS

| 63-53524 | 3/1988 | Japan . |
| 63-53526 | 3/1988 | Japan . |
| 63-53529 | 3/1988 | Japan . |
| 1-94769 | 4/1989 | Japan . |
| 1-130126 | 5/1989 | Japan . |
| 1-130143 | 5/1989 | Japan . |
| 1-131522 | 5/1989 | Japan . |
| 1-292973 | 11/1989 | Japan . |
| 1-298332 | 12/1989 | Japan . |
| 1-300221 | 12/1989 | Japan . |

Primary Examiner—W. B. Perkey
Attorney, Agent, or Firm—Burns, Doane, Swecker & Mathis

[57] ABSTRACT

A camera having a blurring correction apparatus according to the present invention includes a photographic lens for forming an image of an object to be photographed, a detecting apparatus for detecting the degree of movement of the formed image of the object, a correcting apparatus operative at least during exposure time for correcting the position of the image of the object in response to a detection output of the detecting apparatus so as to compensate the movement of the image of the object, a setting apparatus for setting exposure time, a calculating apparatus for calculating the amount of movement of the image of the object produced during exposure time based on the detection output of the detecting apparatus and the set exposure time, and a prohibiting apparatus for prohibiting the operation of the correcting apparatus when the amount of movement of the image of the object produced during exposure time is smaller than a predetermined value.

56 Claims, 32 Drawing Sheets

CAMERA HAVING BLURRING CORRECTION APPARATUS

This application is a continuation of application Ser. No. 07/540,776 filed Jun. 20, 1990, now abandoned.

BACKGROUND OF THE INVENTION

1. Field of the Invention

The present invention relates generally to cameras, and more particularly to a camera having a blurring correction apparatus for compensating a blurring of an image of an object to be photographed on a photographing plane.

2. Description of the Related Art

When a camera is moved by camera-shake or an object to be photographed moves, an image of the object on a photographing plane is blurred, resulting in an incorrect image. Thus, an apparatus for correcting the position of the image of the object to compensate and prevent this blurring has been conventionally proposed as disclosed in, for example, U.S. Pat. No. 4,788,596.

Depending on photographing conditions, the blurring correction is not always required or enabled. For example, no blurring correction is required in case of the small amount of blurring (the small amount of movement) which is produced during set exposure time. Furthermore, it is impossible to correct an excessively high speed blurring or an excessively large amount of blurring.

No consideration has been made for conventionally proposed apparatuses as to what control should be performed in such a photographing condition. Accordingly, the blurring correction sometimes causes such conventional apparatuses to consume useless energy despite a case where no correction is required. In addition, a photographer sometimes misunderstands that a photography is successful due to a sufficient blurring correction despite the fact that no sufficient correction is made.

SUMMARY OF THE INVENTION

An object of the present invention is to enhance reliability in a camera having a blurring correction apparatus.

Another object of the present invention is to improve capabilities of coping with various photographing conditions in a camera having a blurring correction apparatus.

A further object of the present invention is to carry out an efficient blurring correction in a camera having a blurring correction apparatus.

A still further object of the present invention is to appropriately control shutter speed in the event of a slow shutter synchronized photography in a camera having a blurring correction apparatus.

A still further object of the present invention is to perform a suitable flash photography based on components of light received by an object to be photographed in a camera having a blurring correction apparatus.

In order to achieve the above described objects, a camera according to one aspect of the present invention includes a photographic lens for forming an image of an object to be photographed, detecting means for detecting the degree of movement of the formed image of the object, correcting means operative at least during exposure time for correcting the position of the image of the object based on an output of the detecting means so as to compensate the movement of the image, setting means for setting exposure time, calculating means for calculating the amount of movement of the image produced during the exposure time, based on the output of the detecting means and the set exposure time, and prohibiting means for prohibiting the operation of the correcting means when the amount of movement of the image of the object produced during the exposure time is smaller than a predetermined value.

In the camera having the blurring correction apparatus structured as above, the operation of the correcting means is controlled based on the amount of movement of the image of the object, resulting in enhanced reliability of blurring correction.

In order to achieve the foregoing objects, the camera according to another aspect of the present invention includes exposure control means for exposing a film with light from the object, flash means for emitting flashlight, flash control means for controlling the flash means to emit flashlight during exposure, brightness measuring means for measuring color temperature of surrounding light, and altering means for altering the ratio of the amount of exposure by the flashlight to the amount of exposure by the surrounding light dependently on the measured color temperature.

The camera thus structured adjusts the amount of exposure of the flashlight by measuring the color temperature of the surrounding light of the object, thereby enabling a suitable flash photography.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
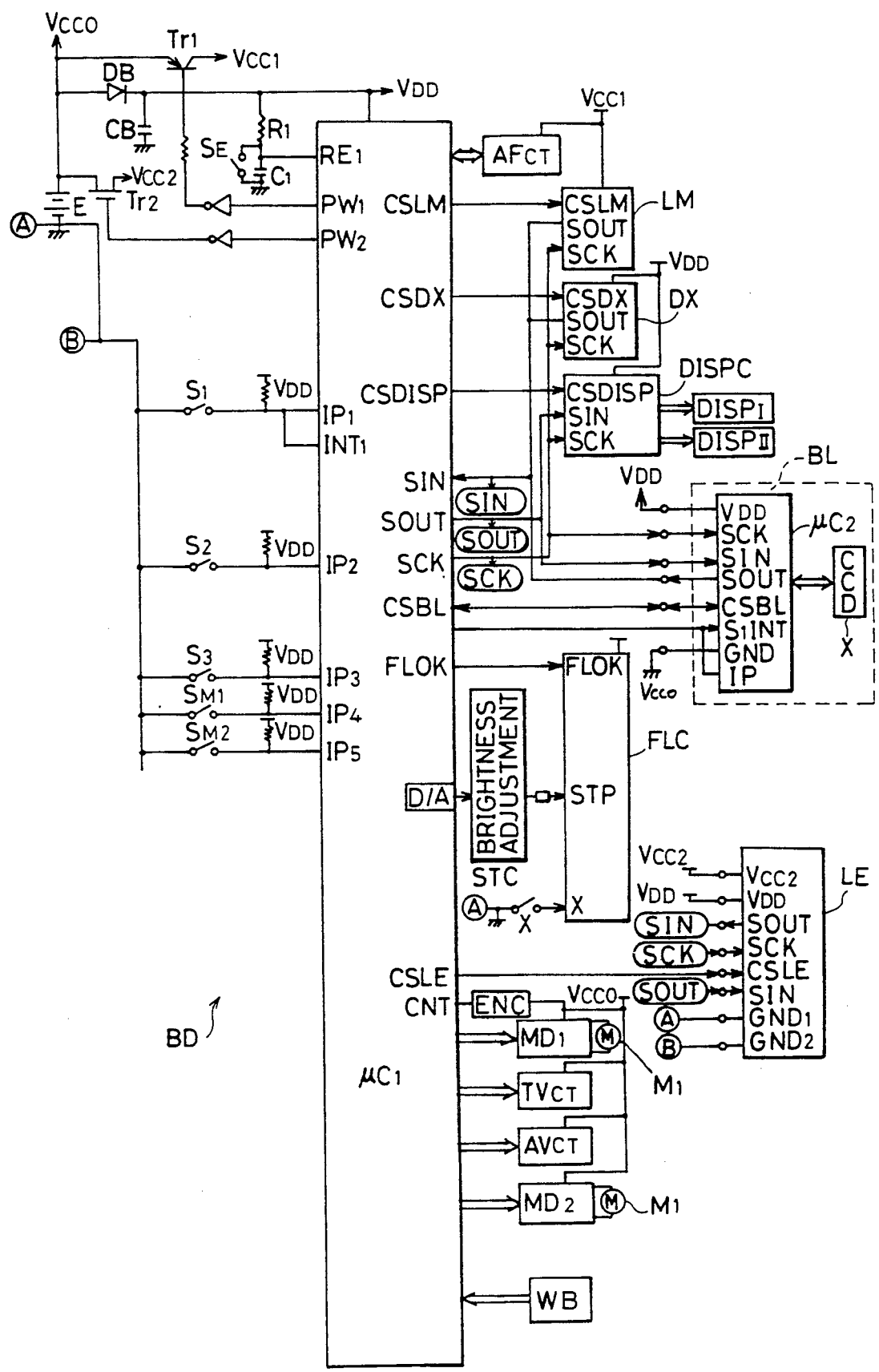
FIG. 1 is a circuit diagram of a camera according to one embodiment of the present invention.

Description will be given on a single-lens reflex camera comprising a zoom lens having a camera-shake correcting function which prevents a formed image of an object to be photographed from blurring due to a camera-shake according to one embodiment of the present invention. FIG. 1 is a block circuit diagram of the camera. In this figure, an in-body microcomputer for performing controls of the entire camera and performing various arithmetic operations is denoted with the symbol $\mu C1$.

A light receiving circuit $AE_{CT}$ for focus detection comprises a CCD line sensor for detecting a focus with respect to an object within a distance measuring range which will be described later, a drive circuit of the CCD line sensor, and a circuit for processing an output of the CCD line sensor to A/D-convert and transmit the same to microcomputer $\mu C1$, and is connected to microcomputer $\mu C1$ via a data bus. The light receiving circuit $AF_{CT}$ provides information relative to a defocus value of the object within the distance measuring range.

A light measuring circuit LM A/D-converts a measured brightness value within a light measuring range which will be described later and then transmits the A/D-converted value as brightness information to microcomputer $\mu C1$.

A film sensitivity reading circuit DX reads data of film sensitivity provided in a film cartridge to serially output the same to microcomputer $\mu C1$.

A display control circuit DISPC is supplied with display data and a display control signal from microcomputer $\mu C1$ to allow a display portion DISPI (see FIG. 45) on the top surface of the camera body and a display portion $DISP_{II}$ (see FIG. 46) in a finder to carry out predetermined displays.

A camera-shake detecting apparatus BL incorporated in the camera body includes a microcomputer $\mu C2$ and a CCD area sensor X for detecting camera-shake. The detailed structure of camera-shake detecting apparatus BL will be described later.

A flash circuit FLC is incorporated in the camera body in this embodiment. The detailed structure of flash circuit FLC will also be described later.

A synchro switch X (so-called X contact) turns on after a preceding shutter curtain has traveled and turns off after a shutter mechanism (not shown) is charged.

An in-lens circuit LE incorporated in an interchangeable lens transmits information inherent to the interchangeable lens to microcomputer $\mu C1$ and also carries out a control for camera-shake correction. The detailed structure of in-lens circuit LE will be described later.

An AF motor M1 drives a focus adjustment lens in the interchangeable lens through an AF coupler (not shown). A motor driving circuit MD1 drives AF motor M1 based on focus detection information. An instruction from microcomputer µC1 controls motor driving circuit MD1 to perform normal rotation, reverse rotation and to stop.

An encoder ENC for monitoring the rotation of AF motor M1 outputs pulses every predetermined angle of rotation to a counter input terminal CNT of microcomputer µC1. Microcomputer µC1 counts the pulses to detect the distance of a forward movement of the focus adjustment lens from an infinite focusing position to the present lens position and thus detects an object distance to the object according to the detected forward movement of lens (the number of pulses in forward movement).

A shutter control circuit $TV_{CT}$ controls a shutter in response to a control signal from microcomputer µC1. The detailed structure of shutter control circuit $TV_{CT}$ will be described later.

An aperture control circuit $AV_{CT}$ controls an aperture in response to a control signal from microcomputer µC1.

A motor M2 carries out film winding-up and rewinding and charging of the shutter mechanism. A motor driving circuit MD2 drives motor M2 based on an instruction from microcomputer µC1.

A white balance circuit WB detects three primary color components of light to evaluate ratio signals of R (red light) to B (blue light) and G (green light) to B, respectively, then converts the evaluated ratio signals. to digital signals and transmits the same to microcomputer µC1. The detailed structure of white balance circuit WB will be described later.

The structure of a power source system will now be described.

A battery E serves as a power source of the camera body.

A first transistor Tr1 serves to supply a power from a power source to portions of the above described circuits. A second transistor Tr2 serves to supply a power from a power source for driving a motor in a lens and is of MOS structure.

A supply voltage $V_{DD}$ serves as an operation power supply of microcomputer µC1, in-lens circuit LE, camera-shake detecting apparatus BL, film sensitivity reading circuit DX and display control circuit DISPC. A supply voltage Vcc1 serves as an operation power supply of focus detecting circuit $AF_{CT}$ and light measuring circuit LM to be supplied from power source battery E via transistor Tr1 under the control of a power supply control signal PW1. A supply voltage Vcc2 is an operation power supply of the in-lens motor and is supplied from power source battery E via transistor Tr2 under the control of a power supply control signal PW2. A supply voltage Vcc0 is an operation power supply of motor driving circuit MD1, shutter control circuit TVCT, aperture control circuit $AV_{CT}$ and motor driving circuit MD2 and is directly supplied from power source battery E. When motor driving circuits MD1 and MD2 and the like, in which a large amount of currents are consumed, operate, currents supplied from power source battery E increase, thereby causing a temporary decrease in battery voltage. Thus, a condenser CB for back-up is charged by power source battery E via a diode DB for reverse current flow prevention to supply a supply voltage $V_{DD}$ to microcomputer µC1 and the like.

Description will now be given on switches.

A preparatory switch S1 is turned on by a first stroke of a release button (not shown). When switch S1 is turned on, an interruption signal is applied to an interruption terminal INT1 of microcomputer µC1, thereby to perform preparatory operations required for photography such as auto focus (hereinafter referred to as AF), photometry and display of various data.

A release switch S2 is turned on by a second stroke of the release button. When switch S2 is turned on, a photographing operation is performed.

A mirror-up switch S3 is turned on when mirror-up is completed, and is turned off when the shutter mechanism is charged and mirror-down is provided.

Select switches $S_{M1}$ and $S_{M2}$ are used to select an exposure mode and set any mode I, II or III which will be described later.

A battery mounting detecting switch $S_E$ is turned off when battery E is mounted in the camera. When battery mounting detecting switch $S_E$ is turned off with battery E mounted, a condenser C1 is charged via a resistor R1 to cause a reset terminal RE1 of microcomputer µC1 to change from a low level to a high level. Accordingly, the proceeding of the control program performed by microcomputer µC1 is put in an interruption state, so that a built-in oscillator automatically operates, and microcomputer µC1 executes a reset routine shown in FIG. 3.

A configuration for serial data communication will now be described.

Light measuring circuit LM, film sensitivity reading circuit DX, display control circuit DISPC and camera-shake detecting apparatus BL carry out serial data communication with microcomputer µC1 via signal lines such as a serial input SIN, a serial output SOUT and a serial clock SCK. Objects to be communicated with microcomputer µC1 are selected by chip select terminals CSLM, CSDX, CSDISP and CSBL. That is, light measuring circuit LM is selected when terminal CSLM is at the low level; film sensitivity reading circuit DX is selected when terminal CSDX is at the low level; display control circuit DISPC is selected when terminal CSDISP is at the low level; and camera-shake detecting apparatus BL is selected when terminal CSBL is at the low level. Further, those three signal lines, SIN, SOUT and SCK for serial communication are connected to in-lens circuit LE, and when in-lens circuit LE is selected as an object to communicate with, a terminal CSLE attains the low level.

Figure 2:
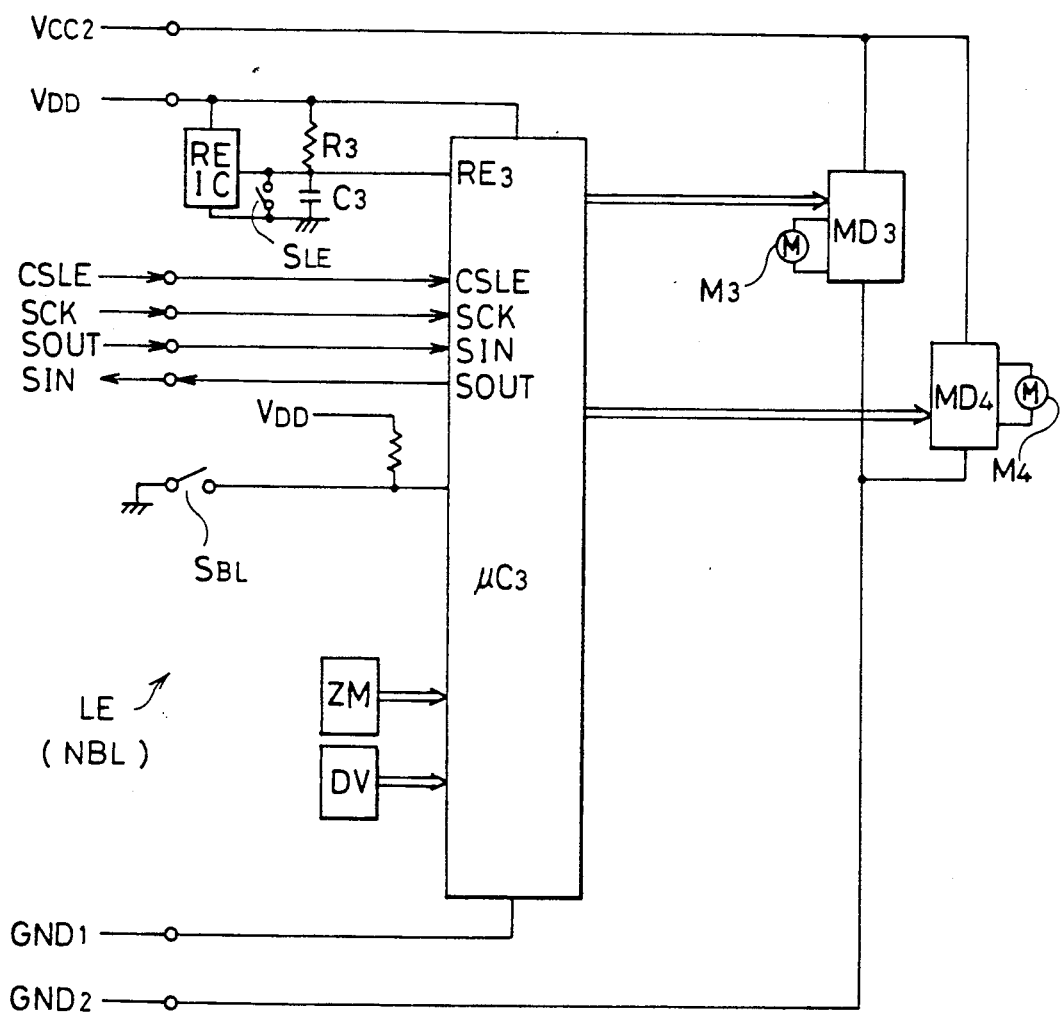
FIG. 2 is a circuit diagram of an in-lens circuit employed in the camera of FIG. 1.

A detailed circuit configuration of in-lens circuit LE incorporated in the interchangeable lens will now be described with reference to FIG. 2. FIG. 2 shows a circuit configuration of a camera-shake correcting lens NBL having a camera-shake correcting function.

In the figure, an in-lens microcomputer µC3 carries out data communication with the camera body and a control for camera-shake correction.

Pulse motors M3, M4 drive the camera-shake correcting lens in k and l directions, respectively, which will be described later.

Motor driving circuits MD3, MD4 drive their respective pulse motors M3, M4 in a positive or negative direction in response to a control signal from microcomputer µC3.

A zoom encoder ZM detects a focal length of a zoom lens. A distance encoder DV detects the distance of forward movement from an infinite focusing position for each focal length. This encoder is used to calculate photographing magnification. Data of the focal length is also used to calculate a limited shutter speed enough for preventing camera-shake.

There are provided a power supply path Vcc2 to motor driving circuits MD3 and MD4 and pulse motors M3 and M4, a power supply path $V_{DD}$ to circuits other than those described above, a ground line GND2 connected to motor driving circuits MD3 and MD4 and pulse motors M3 and M4, and a ground line GND1 connected to the other circuits than the above described.

A terminal CSLE is an input terminal which receives an interruption signal. Microcomputer μC3 executes an interruption LCSINT in response to input of the interruption signal from the camera to lens. There are provided a clock input terminal SCK for transferring serial data, a terminal SIN serving as a serial data input terminal, and a terminal SOUT serving as a serial data output terminal.

A reset circuit REIC resets microcomputer μC3 when a voltage $V_{DD}$ supplied from the camera body becomes equal to or lower than a normal operation voltage of microcomputer μC3. A resistor R3 for resetting and a condenser C3 reset microcomputer μC3.

A reset terminal RE3 of microcomputer μC3 is supplied with a voltage $V_{DD}$ for driving in-lens circuit LE from the body. When resistor R3 and condenser C3 causes terminal RE3 to change from the low level to the high level, microcomputer μC3 carries out a reset operation.

A lens mounting detecting switch $S_{LE}$ is turned off when the interchangeable lens is mounted and locked to camera body BD. That is, when the interchangeable lens is removed from the camera body, switch $S_{LE}$ is turned on and the opposite ends of condenser C3 are shorted. This causes a charge stored in condenser C3 to be discharged, so that reset terminal RE3 of microcomputer μC3 attains the low level. When the interchangeable lens is thereafter mounted on the camera body, switch $S_{LE}$ is turned off, and condenser C3 is charged with a supply voltage $V_{DD}$ via resistor R3. After a predetermined time period determined by a time constant of resistor R3 and condenser C3 has passed, terminal RE3 changes to the high level, and microcomputer μC3 carries out the reset operation as described in the foregoing.

When a camera-shake correction forbidding switch $S_{BL}$ is turned on, a camera-shake correction is not carried out, and the camera also performs a normal AE program operation.

This is the end of the description as to hardware of camera body BD and in-lens circuit LE according to this embodiment. Description of software thereof will now be given. The detailed structure or configuration of camera-shake detecting apparatus BL, flash circuit FLC, shutter control circuit $TV_{CT}$ and white balance circuit WB will be described as necessary in the following description of software.

First, the software of microcomputer μC1 will be described.

Figure 3:
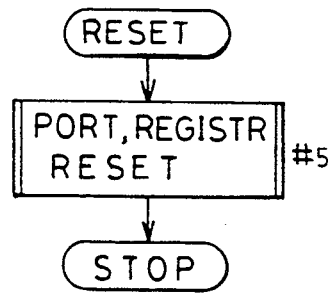
FIG. 3 is a flow chart in the event of reset according to one embodiment of the present invention.

When battery E is mounted in camera body BD, microcomputer μC1 executes a reset routine shown in FIG. 3. In this reset routine, microcomputer μC1 resets each kind of port and register (including a flag) to become a stopped state (a halt state) (#5). In this stopped state, the oscillator incorporated in microcomputer μC1 automatically stops.

Next, when the release button is pressed at the first stroke, preparatory switch S1 is turned on and a signal changing from the high level to the low level is inputted to interruption terminal INT1 of microcomputer μC1. This causes microcomputer μC1 to execute an interruption INT1 shown in FIG. 4. First, microcomputer μC1 supplies a power to each circuit, with power supply control terminal PW1 attaining the high level and with transistor TR1 turned on (#10). Thereafter, microcomputer μC1 outputs a signal changing from the high level to the low level to an interruption terminal S1INT of a microcomputer μC2 in camera-shake detecting apparatus BL (#12).

Next, microcomputer μC1 executes a subroutine of a lens data communication A to read predetermined lens data (#15). A lens data communication includes lens data communication A for transmitting data from the lens to the body and a lens data communication B for transmitting data from the body to the lens.

Figure 5:
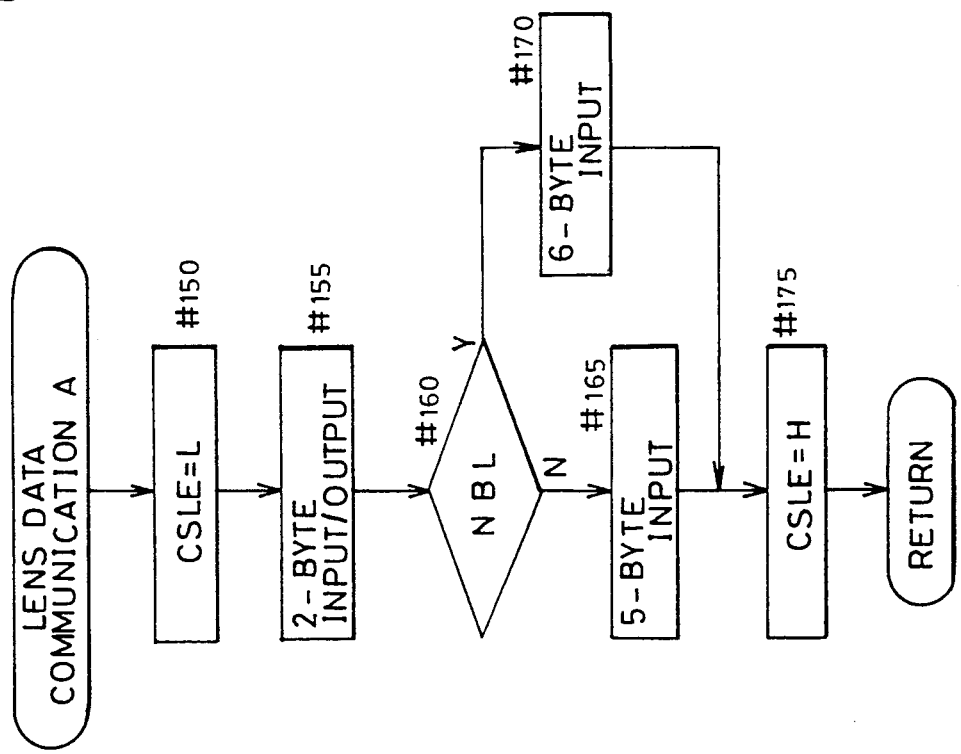
FIG. 5 is a flow chart showing the detailed contents of a routine of a lens data communication A of FIG. 4.

FIG. 5 shows the subroutine of lens data communication A. When the subroutine is called, microcomputer μC3 is first informed that a data communication will be carried out with terminal CSLE being at the low level (#150). Then, data of 2 bytes is transmitted between the lens and body (#155). As to the data at the first byte, a body status data ICPB is transmitted from the body to lens, while meaningless data $FF_H$ (the affix "$_H$" denotes hexadecimal number) is transmitted from the lens to body. Body status data ICPB includes data representing the type of the body and of lens communication. As to the data at the second byte, a lens status ICPL is transmitted from the lens to body, while meaningless data $FF_H$ is transmitted from the body to lens. Lens status data ICPL includes data representing the type of the lens (whether it is a camera-shake correction lens or not) and an ON/OFF state of camera-shake correction forbidding switch $S_{BL}$. Microcomputer μC1 determines whether or not the interchangeable lens is camera-shake correction lens NBL based on data applied from the lens. If the lens is the camera-shake correction lens, microcomputer μC1 inputs data of 6 bytes, but if not, it inputs data of 5 bytes (#160–#170). Then, microcomputer μC1 returns with terminal CSLE attaining the high level to indicate the termination of the data communication (#175). The data at the third byte which is inputted from the lens to body is a focal length f, the data at the fourth byte is a full open aperture value AVo, the one at the fifth byte is a maximal aperture value AVmax, the one at the sixth byte is a conversion coefficient $K_L$ to convert the amount of defocus to the number of revolutions of AF motor M1, and the one at the seventh byte is distance data. When the interchangeable lens is not the camera-shake correction lens, the total data up to 7 bytes are inputted. When the lens is the camera-shake correction lens, the data by the amount of which enables camera-shake correction is further inputted from the lens. Description as to this will be given later.

Figure 4:
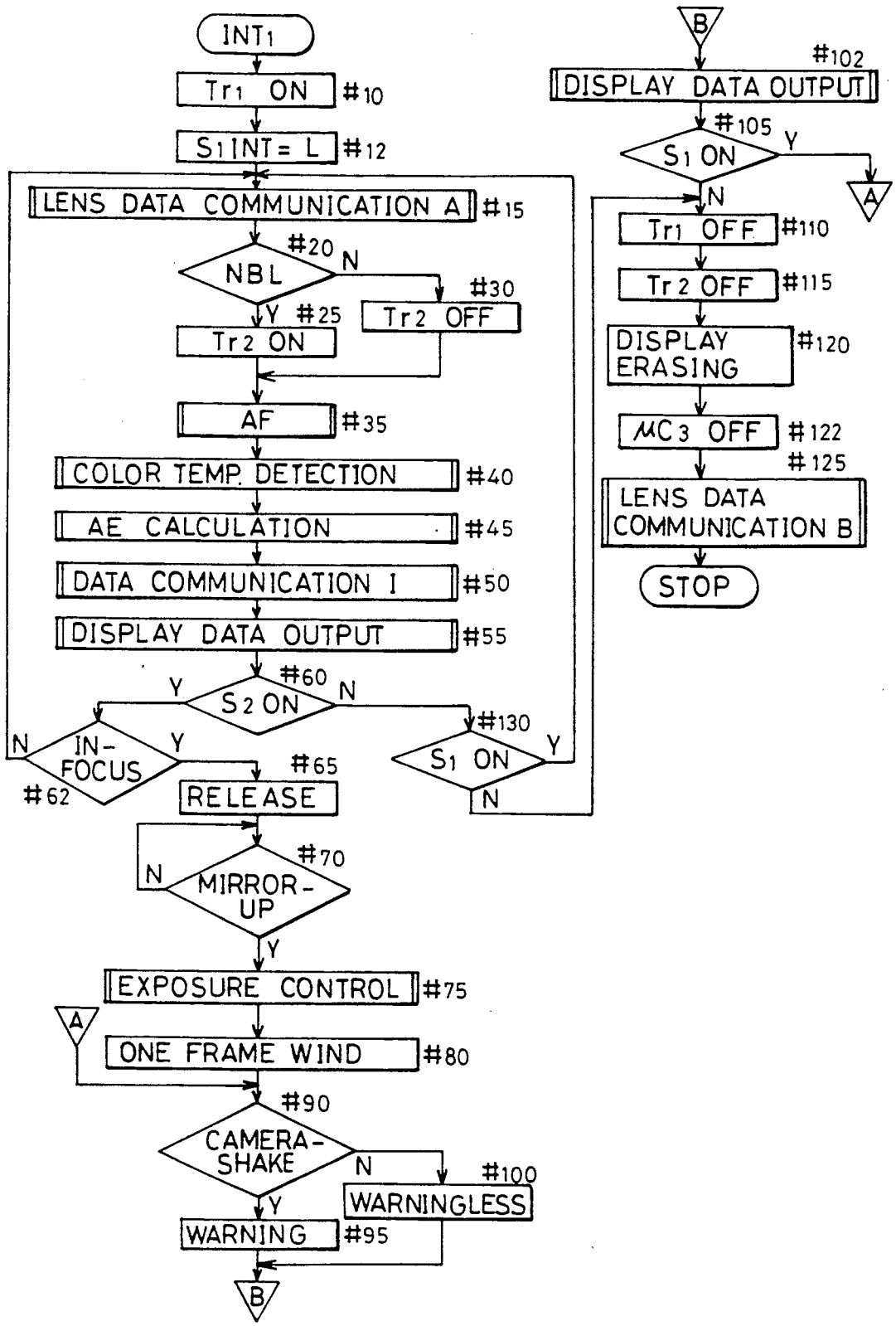
FIG. 4 is a flow chart in the event of interruption according to one embodiment of the present invention.

After the subroutine of lens communication A in #15 of FIG. 4, microcomputer μC1 determines whether or not the interchangeable lens is camera-shake correction lens NBL based on lens data inputted (#20). If the interchangeable lens is the camera-shake correction lens, microcomputer μC1 turns on transistor Tr2 with a power supply control terminal PW2 being at the high level and then supplies a supply voltage Vcc2 to in-lens circuit LE. If the lens is not the camera-shake correction lens, microcomputer μC1 turns off transistor Tr2 with power supply control terminal PW2 being at the low level and then stops supplying supply voltage Vcc2 to in-lens circuit LE (#25, #30). Then, a subroutine of AF is executed so as to perform an AF operation (#35).

Figure 7:
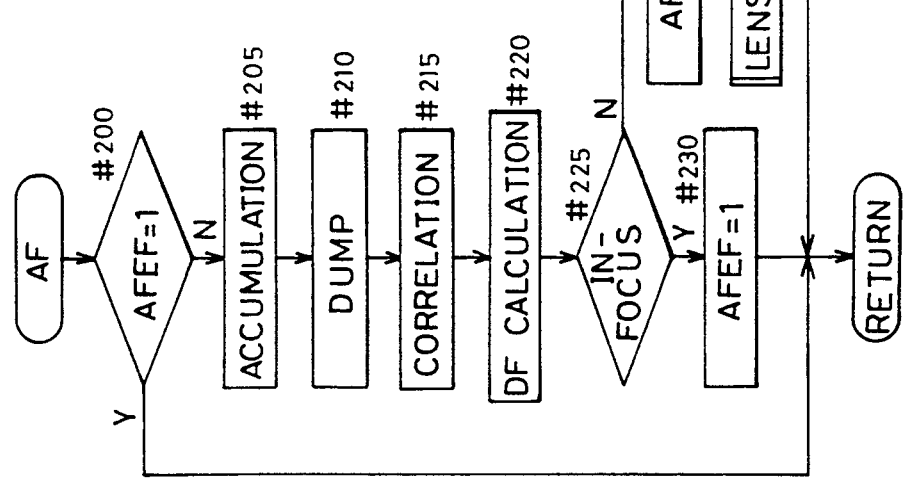
FIG. 7 is a flow chart showing the detailed contents of an AF routine of FIG. 4.

The contents of this AF subroutine are shown in FIG. 7. When the subroutine is called, microcomputer μC1 first determines whether a flag AFEF indicating in-focus is set (#200). When flag AFEF is set, microcomputer μC1 determines that the focusing state is already an in-focus state and returns without carrying out the AF operation. When flag AFEF is not set, it carries out accumulation (storage of a charge) of the CCD line sensor in light receiving circuit $AF_{CT}$ for focus detection. After completing the accumulation, microcomputer μC1 dumps A/D-converted data and then carries out a correlating calculation based on the data inputted, then to calculate the amount of defocus DF (#205-#220). It makes a determination whether or not the state is the in-focus state according to this defocus amount DF. If the state is the in-focus state, microcomputer μC1 sets flag AFEF to make a return (#225, #230). If the state is not the in-focus state, microcomputer μC1 resets flag AFEF and then executes a subroutine of lens drive thereby to make a return (#235, #240).

Figure 8:
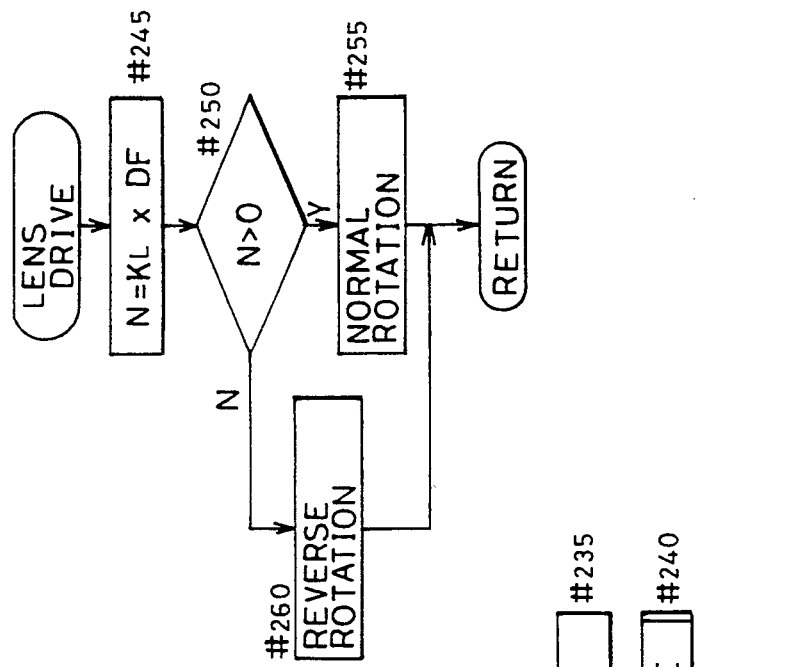
FIG. 8 is a flow chart showing the detailed contents of a lens drive routine of FIG. 7.

The contents of the subroutine of lens drive are shown in FIG. 8. When this subroutine is called, microcomputer μC1 calculates the number of revolutions N of AF motor M1 by multiplying the resultant amount of defocus DF by coefficient $K_L$ for converting the amount of lens drive, so as to determine whether the number of revolutions N is positive or not. If the revolution number N is positive, microcomputer μC1 outputs a control signal to lens driving circuit MD1 so as to normally rotate AF motor M1. If the revolution number N is negative, microcomputer μC1 outputs a control signal to lens driving circuit MD1 so as to reversely rotate AF motor M1. Then, microcomputer μC1 makes a return (#245-#260).

Figure 9:
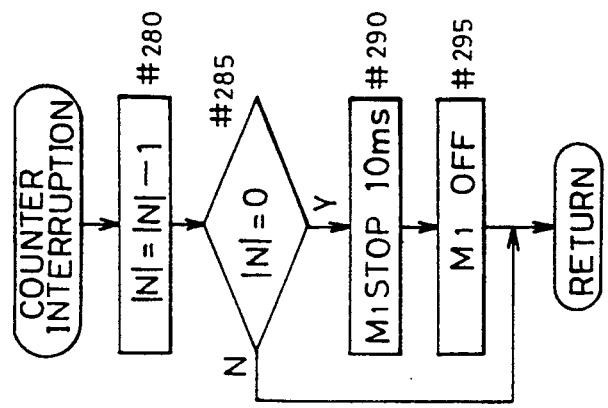
FIG. 9 is a flow chart showing the detailed contents of a counter interruption routine according to one embodiment of the present invention.

A flow of a counter interruption for driving the lens by the revolution number N will now be described with reference to FIG. 9. The counter interruption is executed every time pulses are inputted from encoder ENC for monitoring the rotation of AF motor M1. In this interruption, microcomputer μC1 subtracts 1 from an absolute value |N| of the revolution number N to obtain a new absolute value |N|, thereby to determine whether this new value |N| is 0 (#280, #285). When |N|=0, microcomputer μC1 outputs a stop signal of AF motor M1 to motor driving circuit MD1 at 10 msec and, thereafter outputs a control signal to turn off AF motor M1 and then makes a return (#290, #295). When |N| is not equal to 0, microcomputer μC1 immediately makes a return.

Figure 37:
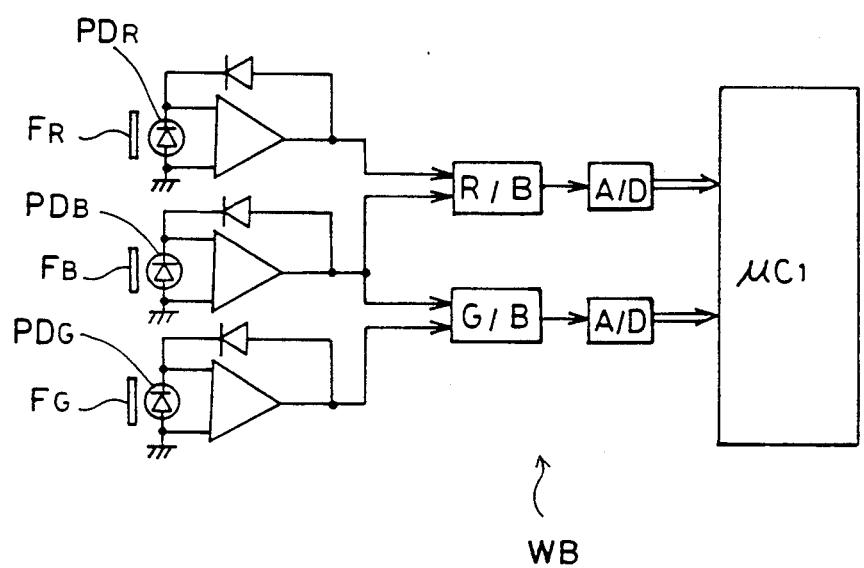
FIG. 37 is a circuit diagram of a white balance circuit according to one embodiment of the present invention.

After the execution of the subroutine of AF in #35 of FIG. 4, microcomputer μC1 executes a subroutine of color temperature detection (#40). The configuration of white balance circuit WB for detecting a color temperature is shown in FIG. 37. Color filters $F_R$, $F_G$ and $F_B$ for transmitting R (red light), G (green light) and B (blue light), respectively, are provided on respective photosensitive surfaces of three photosensitive elements motor driving circuit MD1 at 10 msec and, thereafter $PD_R$, $PD_G$ and $PD_B$. Accordingly, signals $S_R$, $S_G$ and $S_B$ representing luminous intensities of the three primary colors R, G and B, respectively, are obtained. A logarithmic compression circuit logarithmically compresses each of these signals. In the figure, an operation amplifier to which a diode is connected as a feedback impedance functions as a logarithmic compression circuit. A differential amplifier at the succeeding stage evaluates the differences between signals $S_R$ and $S_B$ and between $S_G$ and $S_B$ to obtain respective ratio signals $S_R/S_B$ and $S_G/S_B$, and then A/D-converts these obtained ratio signals in a predetermined period to transmit the A/D-converted signals to microcomputer μC1. Since each of the signals $S_R$, $S_G$ and $S_B$ is handled as logarithm, the evaluation of the respective differences therebetween by the differential amplifier makes it possible to obtain the respective ratio signals.

Figure 10:
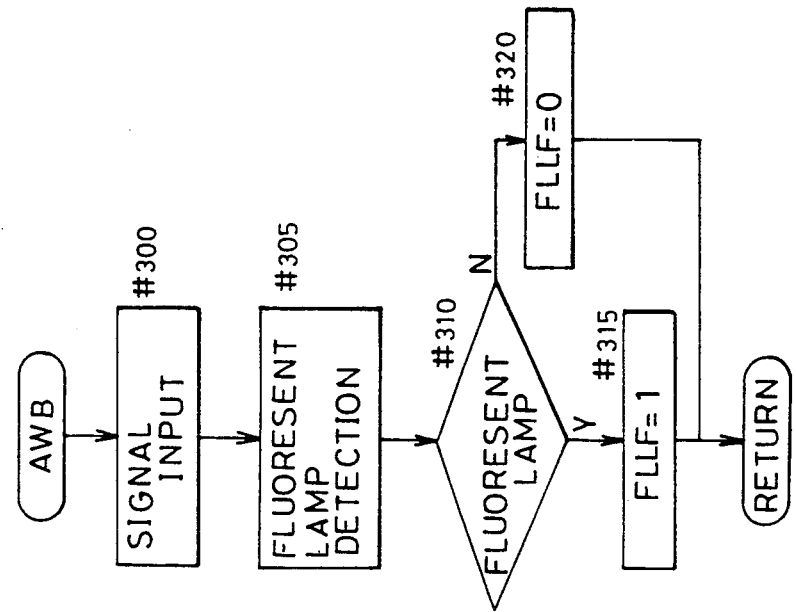
FIG. 10 is a flow chart showing the detailed contents of an AWB routine according to one embodiment of the present invention.

FIG. 10 shows the subroutine of color temperature detection (AWB: auto white balance). When this subroutine is called, microcomputer μC1 receives a signal which is A/D converted by white balance circuit WB shown in FIG. 37, and then determines whether a light source is a fluorescent lamp or not (#300, #305). When the light source is a fluorescent lamp, G (green light) components increase, and hence ratio signals $S_G/S_B$ becomes remarkably increased. Detecting this increase, microcomputer μC1 determines whether the light source is a fluorescent lamp. If the light source is the fluorescent lamp, microcomputer μC1 sets a flag FLLF, but if not, it resets flag FLLF and, thereafter makes a return (#310-#320).

Figure 11:
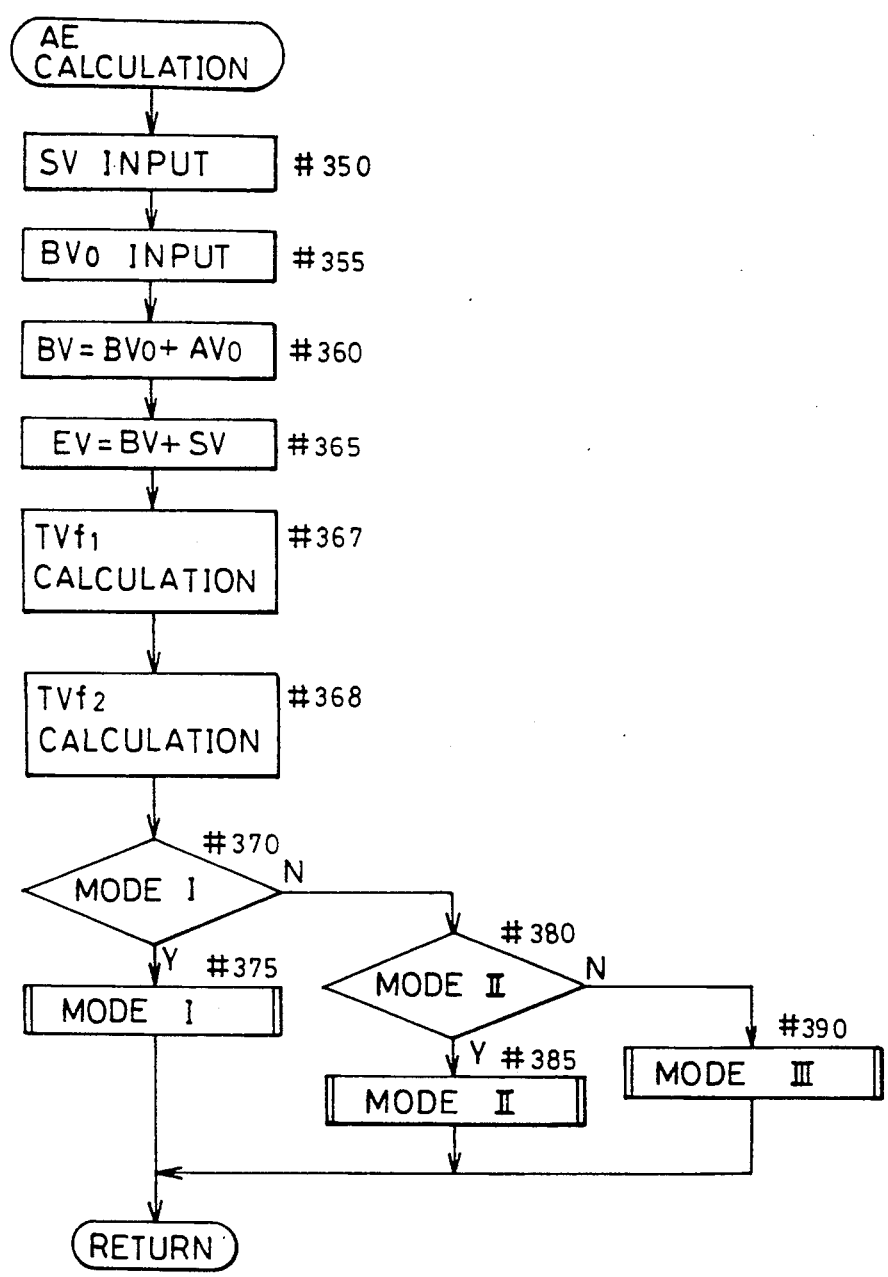
FIG. 11 is a flow chart showing the detailed contents of an AE calculation routine of FIG. 4.

After the execution of the subroutine of color temperature detection in #40 of FIG. 4, microcomputer μC1 executes a subroutine of an AE calculation (automatic exposure calculation) (#45). This subroutine is shown in FIG. 11. When this subroutine is called, microcomputer μC1 first reads a film sensitivity SV from film sensitivity reading circuit DX by serial communication, and then reads an open aperture measured brightness value BVo from light measuring circuit LM by serial communication (#350, #355). Thereafter, it evaluates a measured brightness value BV from BV=BVo+AVo and also evaluates an exposure value EV from EV=BV+SV (#360, #365). Then, microcomputer μC1 evaluates a limited shutter speed for camera-shake, with a camera-shake correcting lens unattached, from data of a focal length f (mm) by 1/f (sec), then converts the evaluated limited shutter speed to an APEX value TVf1 (#367). Similarly, microcomputer μC1 evaluates a limited shutter speed for camera-shake, with the camera-shake correction lens mounted, by 32/f (sec), then converts the evaluated shutter speed to an APEX value TVf2 (#368). It is considered here that with the camera-shake correction lens mounted, the limited shutter speed for camera-shake can be reduced down to −5EV of APEX value, i.e., in exposure time 32 times as long as normal exposure time.

In addition, microcomputer μC1 determines an exposure mode dependently on the state of select switches $S_{M1}$ and $S_{M2}$ for mode selection, then executes a subroutine of each of mode I (normal mode), mode II (portrait photographing mode) and mode III (scenery photographing mode) according to the result of the determination, and thereafter makes a return (#370-#390). Description will now be given of an AE program line diagram of each mode prior to descriptions of the subroutines of the modes I, II and III, with reference to FIGS. 33-35.

Figure 33:
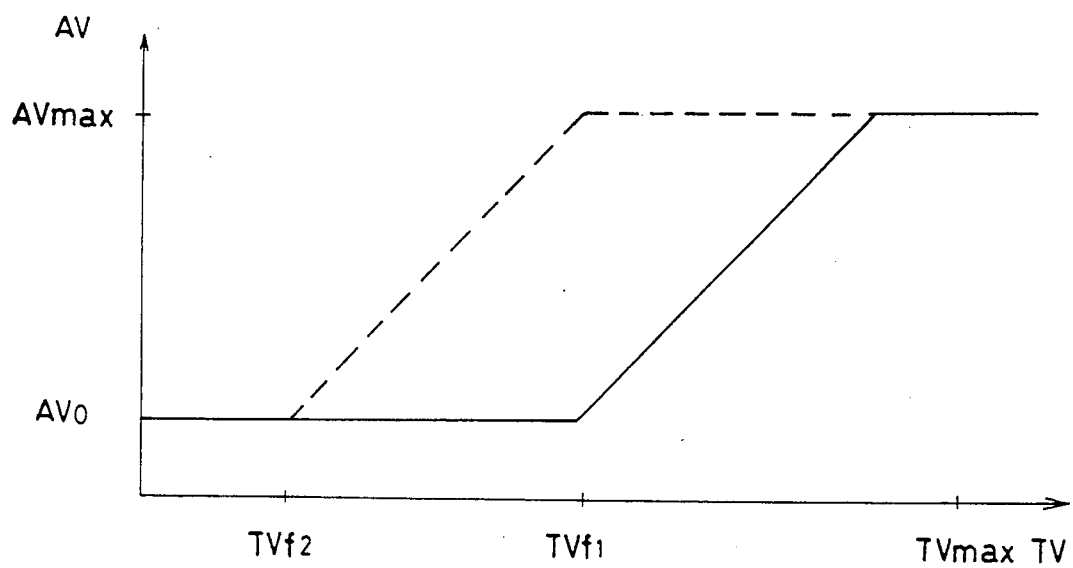
FIG. 33 is an AE program line diagram in mode I according to one embodiment of the present invention.

FIG. 33 is an AE program line diagram of mode I (normal mode). In this mode, for exposure value EV, the combination of full open aperture value AVo and a shutter speed TV equal to or lower than TVf1 or TVf2 is provided during the course from low brightness to limited shutter speed TVf1 or TVf2 for camera-shake. When exposure value EV becomes higher than the above, shutter speed TV and aperture value AV are allotted with the ratio of 1:1 for exposure value EV. When aperture value AV reaches a maximum aperture value AVmax, the allotment is terminated and only shutter speed TV is varied. A flash photography is performed at a shutter speed lower than TVf1 or TVf2, or at a brightness value BV lower than 5.

Figure 34:
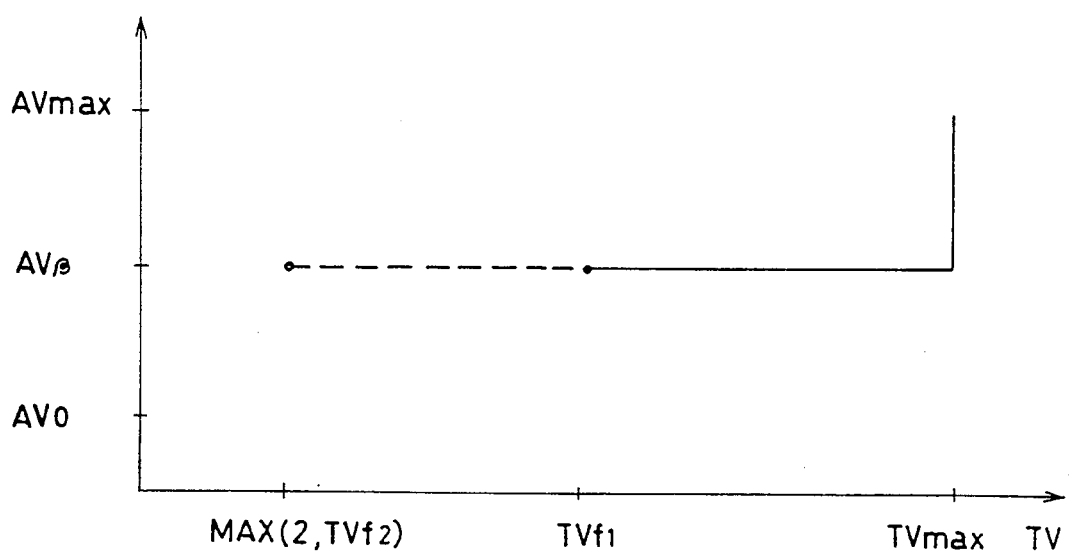
FIG. 34 is an AE program line diagram in mode II according to one embodiment of the present invention.

FIG. 34 is an AE program line diagram of mode II (portrait photographing mode). In this mode, a photographing aperture value AV is set to an aperture value $AV\beta$ evaluated from a photographing magnification $\beta$. A shutter speed TV is evaluated from the evaluated aperture value AV and exposure value EV. The aperture value AV varies when a shutter speed exceeds TVmax. A flash photography is carried out at a shutter speed TV lower than TVf1 or TVf2 or at a brightness value BV lower than 5. With the camera-shake correction lens, a limit of the lower shutter speed in flash photography is set to the higher value out of $TV=2$ ($\frac{1}{4}$ sec in real time) and TVf2. It is natural to set the lower limit to limited shutter speed TVf2 for camera-shake in order to prevent camera-shake; however, the reason why the lower limit is set to $TV=2$ is that in the case of portrait photography, the object is hardly stationary, often causing double exposure which results in a poor photography with shades produced. This becomes a disadvantage especially for the flash photography since after flashlight is emitted, a person to be photographed sometimes moves thinking that the photography is completed.

Figure 36:
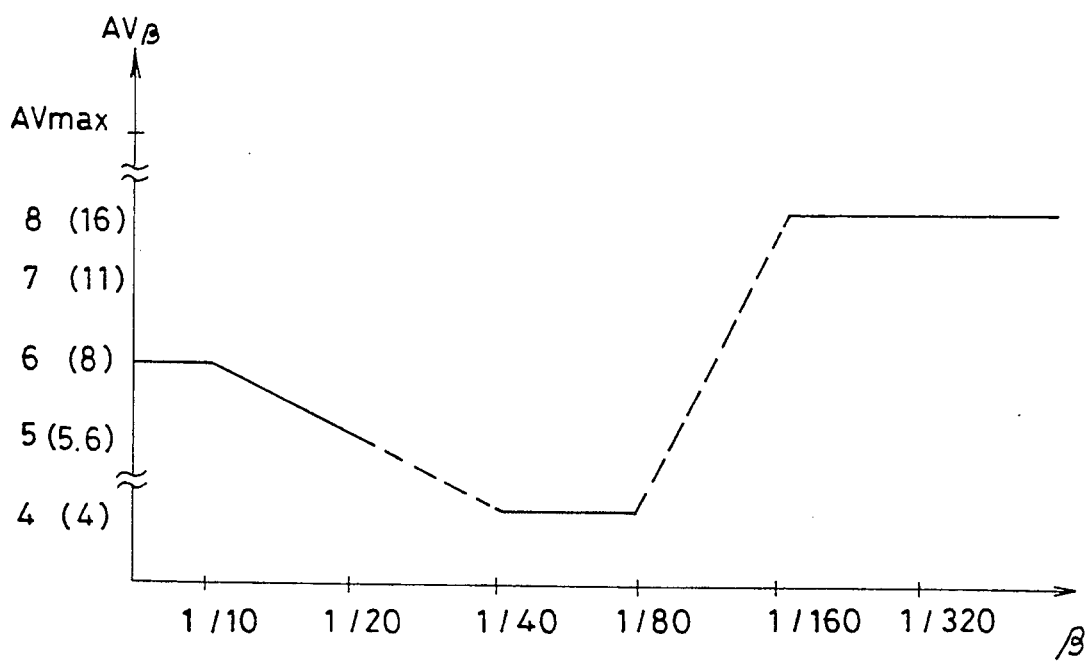
FIG. 36 is a diagram showing the relation between photographing magnification and aperture value in a portrait photographing mode according to one embodiment of the present invention.

FIG. 36 shows a graph for determining aperture value $AV\beta$ according to the above described photographing magnification $\beta$. In the figure, the abscissa represents photographing magnification $\beta$ and the ordinate represents aperture value $AV\beta$. The scale of the ordinate represents an aperture value BY an APEX value with F numbers attached in parentheses. When $\beta \geq 1/10$, $AV=6$ (F8); when $1/10 \geq \beta \geq 1/40$, a value on the straight line connecting $AV=6$ (F8) and $AV=4$ (F5.6); when $1/40 > \beta \geq 1/80$, $AV=4$ (or a full open aperture value); when $1/80 > \beta \geq 1/160$, a value on the straight line connecting $AV=4$ (F4) and $AV=8$ (F16) is provided; and when $1/160 > \beta$, $AV=8$ (F16). When $\beta > 1/20$, the aperture value is stopped down a little for macro photography to increase depth of field; when $1/20 > \geq \beta \geq 1/100$, the depth of field is decreased as portrait photography; and when $\beta < 1/100$, the aperture value is stopped down little by little up to $AV=8$ at $\beta \leq 1/160$ as scenery photography, to obtain the depth of field. In this embodiment, a data table is provided which reads the photographing magnification $\beta$ as being address and the aperture value $AV\beta$ as being data in this graph.

Figure 35:
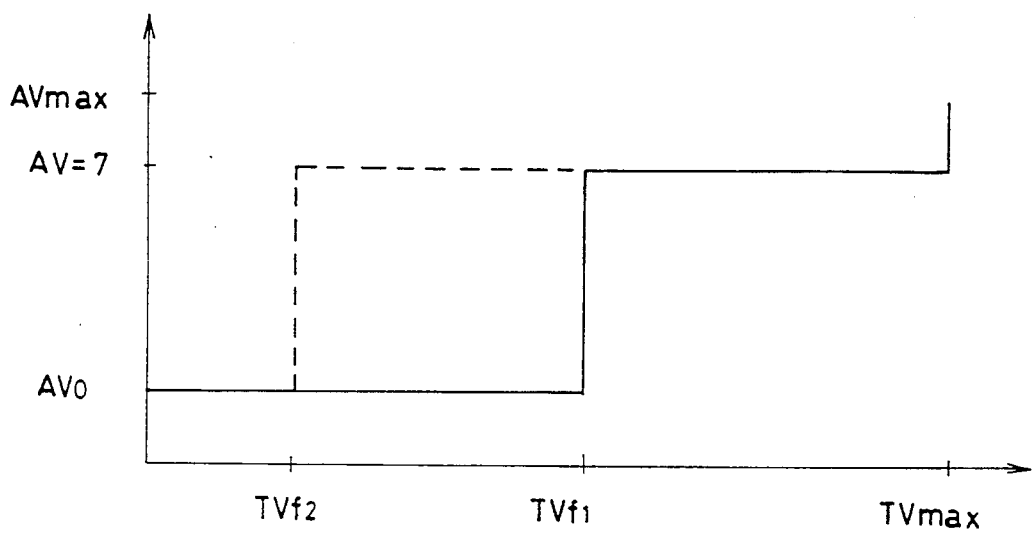
FIG. 35 is an AE program line diagram in mode III according to one embodiment of the present invention.

FIG. 35 is an AE program line diagram of mode III (scenery photographing mode). In this mode, a predetermined aperture value F11 ($AV=7$) is set from limited shutter speed TVf1 or TVf2 for camera-shake to maximal shutter speed TVmax so as to obtain more increased depth of field. In case where a shutter speed evaluated from exposure value EV is higher than maximal shutter speed TVmax, the aperture is varied from the predetermined aperture value ($AV=7$) up to the maximal aperture value AVmax with the shutter speed staying at TVmax. In case where the shutter speed becomes equal to or lower than limited shutter speed TVf1 or TVf2 for camera-shake in connection with exposure value EV, the shutter speed TV is TVf1 or TVf2 and the aperture value AV becomes decreased from the predetermined aperture value F11 ($AV=7$) to the full open aperture value AVo. After the aperture is opened up to the full open aperture value AVo, the shutter speed TV is further lowered. The flash photography is not carried out at this time.

Next, the subroutines of modes I, II and III will be described with reference to FIGS. 12-14. First, the subroutine of mode I shown in FIG. 12 will be explained. When this subroutine is called, microcomputer $\mu$C1 determines whether or not the interchangeable lens is a camera-shake correction lens. If the interchangeable lens is the camera-shake correction lens, microcomputer $\mu$C1 executes a subroutine of AV, TV calculation (1) for determining aperture value AV and shutter speed TV (#400, #405).

Figure 14:
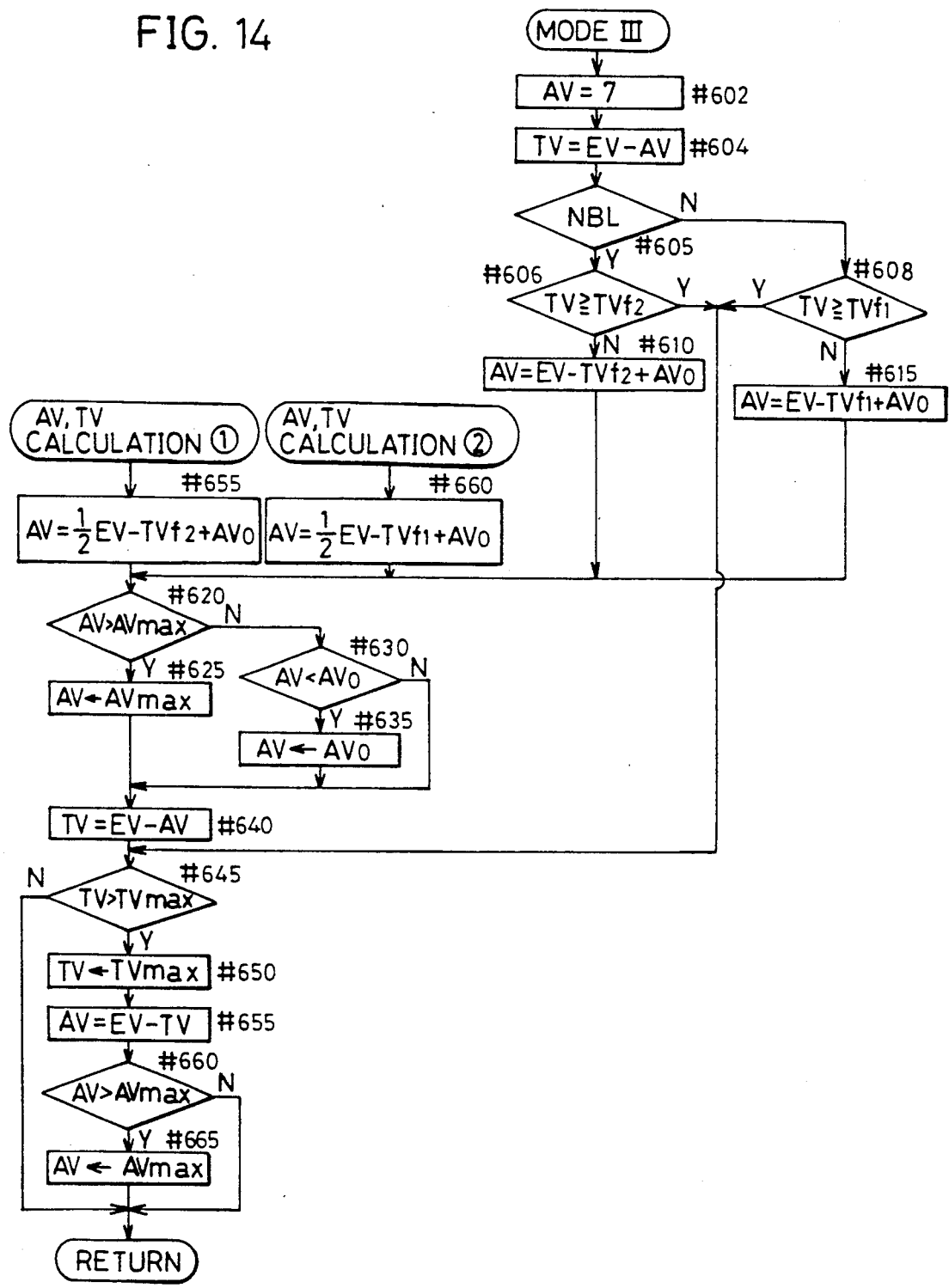
FIG. 14 is a flow chart showing the detailed contents of a routine in mode III of FIG. 11.

FIG. 14 shows the subroutine of AV, TV calculation (1) When this subroutine is called, microcomputer $\mu$C1 first evaluates aperture value AV from the expression $AV = EV/2 - TVf2 + AVo$ (#655). When this aperture value AV is over the maximal aperture value AVmax, microcomputer $\mu$C1 sets the maximal aperture value AVmax as aperture value AV. When the aperture value AV is lower than the minimal (full open) aperture value AVo, it sets the minimal aperture value AVo as aperture value AV (#620-#635). Then, microcomputer $\mu$C1 evaluates shutter speed TV from the resultant aperture value AV and exposure value EV by the expression $TV=EV-AV$ (#640). When the shutter speed TV is equal to or lower than the maximal (highest) shutter speed TVmax, microcomputer $\mu$C1 makes a return shutter speed TVmax, it sets the maximal shutter speed TVmax as shutter speed TV to re-evaluate the aperture value AV from $AV=EV-TV$ (#650, #655). When this aperture value AV exceeds the maximal aperture value AVmax, it sets the maximal aperture value AVmax as aperture value AV. Meanwhile, when the aperture value AV is equal to or lower than the maximal aperture value AVmax, microcomputer $\mu$C1 makes a return as it is (#660, #665).

Figure 12:
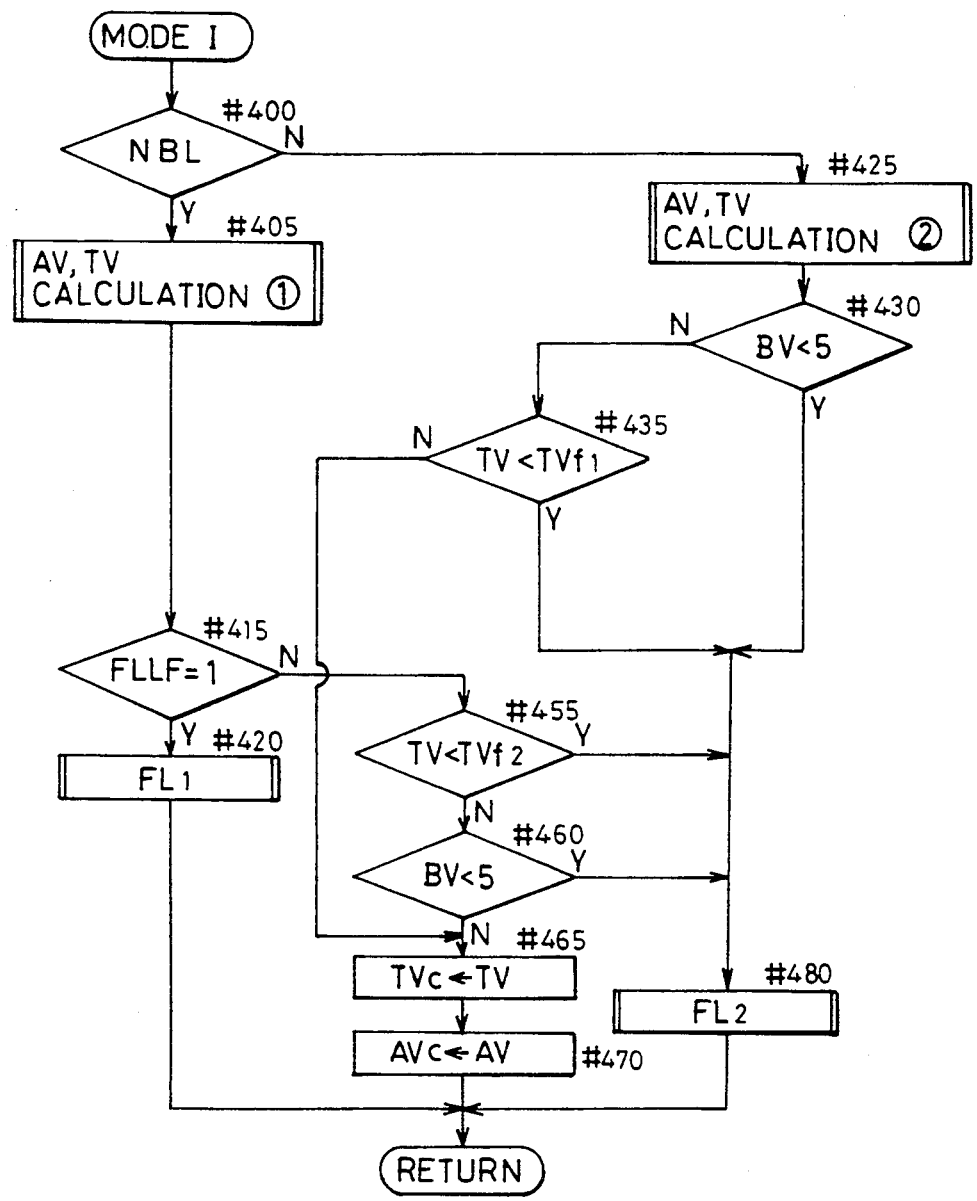
FIG. 12 is a flow chart showing the detailed contents of a routine in mode I of FIG. 11.

After executing the subroutine of AV, TV calculation (1) in #405 of FIG. 12, microcomputer $\mu$C1 determines whether the light source is a fluorescent lamp (FLLF=1) (#415). If the light source is the fluorescent lamp, microcomputer $\mu$C1 executes a subroutine of a flash photography FL1 to make a return (#420). In case where the light source is the fluorescent lamp, green prevails in the light based on the relation of color temperature thereof Thus, microcomputer $\mu$C1 controls the ratio of the amount of surrounding light to that of flashlight to be 1:2 (normally, however, 1:1) so as to prevent a little the prevailing of green, but still leaving the touch of green.

Figure 15:
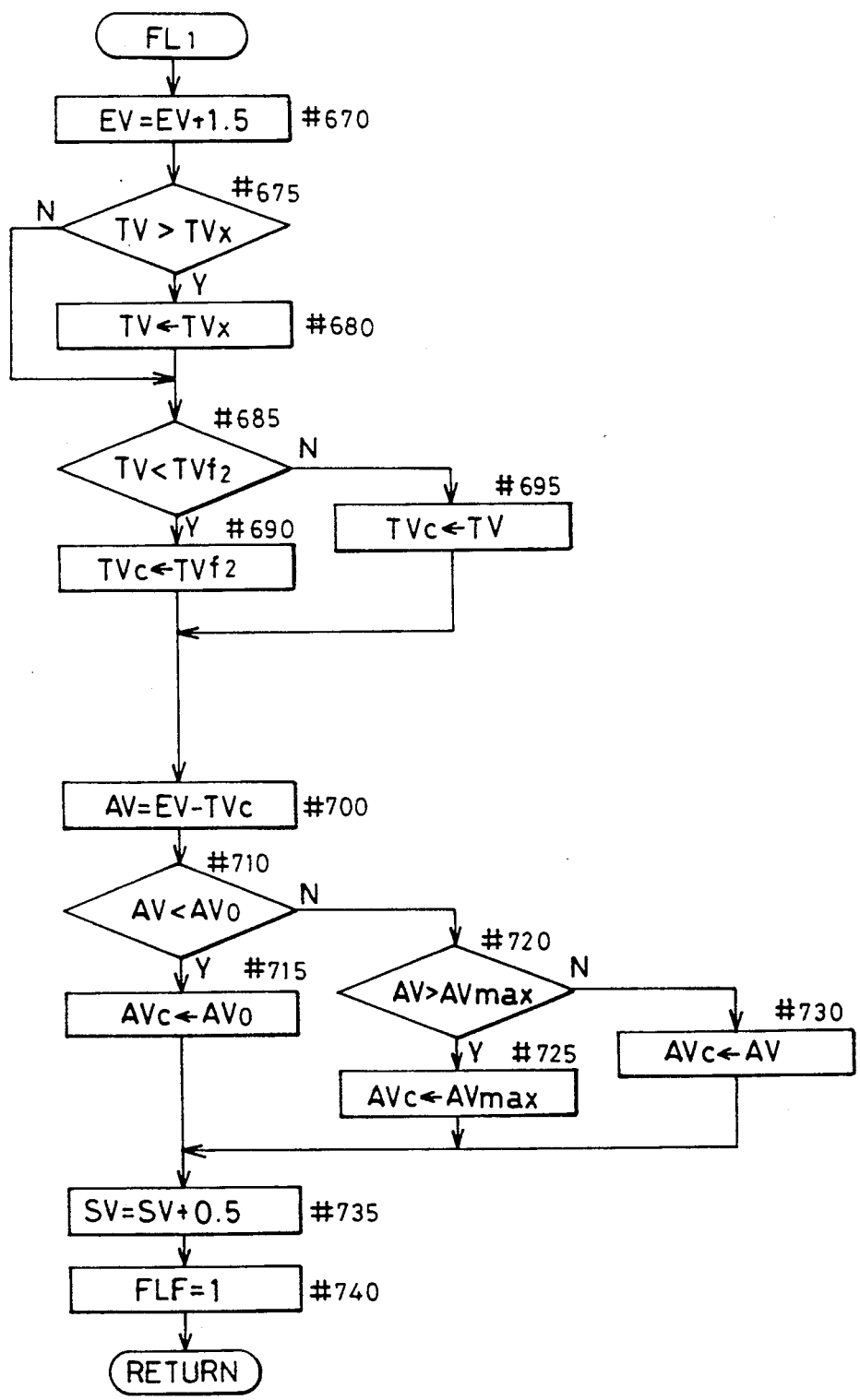
FIG. 15 is a flow chart showing the detailed contents of a routine of FL1 of FIG. 12.

FIG. 15 shows the subroutine of this flash photography FL1. When this subroutine is called, microcomputer $\mu$C1 first sets a controlling exposure value EV to $EV + 1.5$ and the value of surrounding light components to be lowered by 1.5EV (#670). Then, it determines whether or not the determined shutter speed TV is over a flash synchronized maximal speed TVx (#675). It is now assumed that flash synchronized maximal speed TVx is TVx=8 (1/250 sec in real time) represented by APEX value. When shutter speed TV exceeds flash synchronized maximal speed TVx in #675, microcomputer $\mu$C1 sets flash synchronized maximal speed TVx as shutter speed TV in #680. However, when shutter speed TV is equal to or lower than flash synchronized maximal speed TVx, microcomputer μC1 carries out nothing. Thereafter, the program proceeds to #685 in both cases. In #685, microcomputer μC1 determines whether or not shutter speed TV is lower than limited shutter speed TVf2 for camera-shake. When shutter speed TV is lower than limited shutter speed TVf2 in #685, microcomputer μC1 sets limited shutter speed TVf2 for camera-shake as a controlling shutter speed TVc in #690. However, when shutter speed Tv is equal to or higher than limited shutter speed TVf2, it sets the shutter speed TV obtained as the controlling shutter speed TVc in #695. Thereafter, the program proceeds to #700 in both cases. The aperture value AV is evaluated by AV=EV−TVc in #700 evaluated aperture value AV is lower than the minimal aperture value AVo, microcomputer μC1 sets the minimal aperture value AVo as a controlling aperture value AVc. When the evaluated aperture value AV exceeds the maximal aperture value AVmax, it sets the maximal aperture value AVmax as controlling aperture value AVc. When the evaluated aperture value is neither of the above cases, microcomputer μC1 sets the evaluated aperture value AV as controlling aperture value AVc (#710–#730). Then, microcomputer μC1 sets SV=SV+0.5 so as to make the amount of flashlight to be emitted (adjusted amount of brightness) be lowered by 0.5EV, and sets a flag FLF to show that the flash photography is carried out, thereafter making a return (#735, #740).

Returning to the flow of FIG. 12, when a determination is made that the light source is not the fluorescent lamp (FLLF=0) in #415, microcomputer μC1 moves to #455 and determines whether or not the evaluated shutter speed TV is lower than the limited shutter speed TVf2 for camera-shake. When the shutter speed TV is lower than the limited shutter speed TVf2 in #455, it proceeds to #480 execute a subroutine of a flash photography FL2 (#480).

Figure 16:
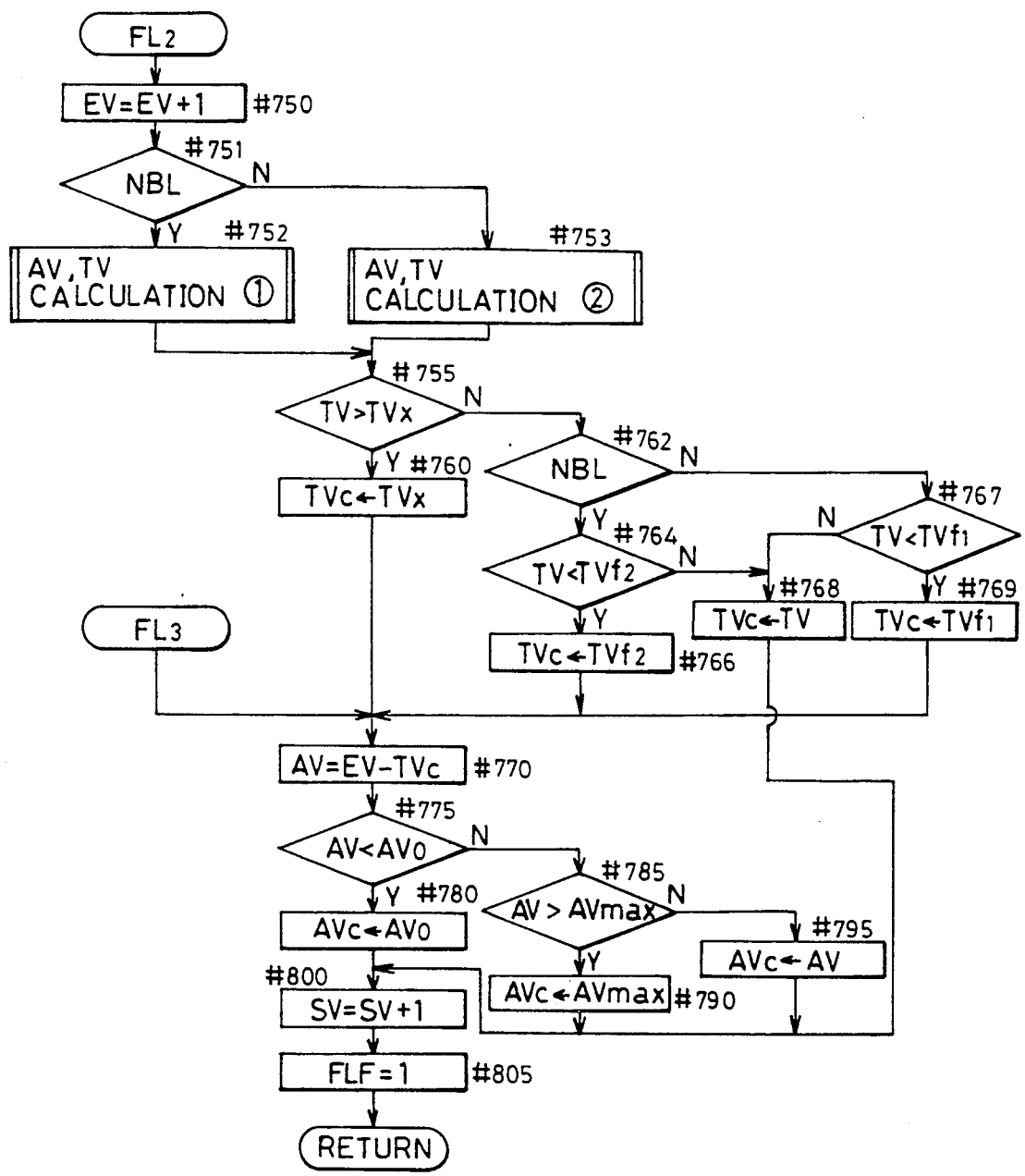
FIG. 16 is flow chart showing the detailed contents of a routine of FL2 of FIG. 12.

FIG. 16 shows the subroutine of this flash photography FL2. In this subroutine, microcomputer μC1 controls such that the ratio of the amount of surrounding light to that of flashlight is 1:1, a main object is appropriately exposed, and the background is lowered by 1EV. First, microcomputer μC1 adds 1 to the exposure value EV obtained by the calculation, thereby to set a controlling exposure value EV to be lowered by 1EV in #750. In #751, it determines whether the interchangeable lens is camera-shake correction lens NBL. If the interchangeable lens is the camera-shake correction lens, it executes the above-described subroutine of AV, Tv calculation (1). However, if the lens is not the camera-shake correction lens, it executes a subroutine of AV, TV calculation (2) which will be described later. Microcomputer μC1 calculates aperture value AV and shutter speed TV in each subroutine and then proceeds to #755 (#752, #753). In #755, microcomputer μC1 makes a determination whether or not the shutter speed TV evaluated by the calculation is over the flash synchronized maximal speed TVx. When shutter speed TV exceeds flash synchronized maximal speed TVx in #755, it sets flash synchronized maximal speed TVx as controlling shutter speed TVc in #760 and then proceeds to #770. When shutter speed TV is equal to or lower than flash synchronized maximal speed TVx in #755, microcomputer μC1 proceeds to #762 and then determines whether the interchangeable lens is camera-shake correction lens NBL. If the lens is the camera-shake correction lens, it makes a determination whether the shutter speed T evaluated by the calculation is lower than the limited shutter speed TVf2 for camera-shake (#764). If the shutter speed Tv is lower than the limited shutter speed TVf2 in #764, it sets the limited shutter speed TVf2 as controlling shutter speed TVc in #766 and then proceeds to #770. If shutter speed TV is equal to or higher than the limited shutter speed TVf2 in #764, it sets the shutter speed TV evaluated by the calculation as controlling shutter speed TVc in #768 and then proceeds to #800. When determining that the interchangeable lens is not the camera-shake correction lens in #762, microcomputer μC1 determines whether shutter speed TV is lower than the limited shutter speed TVf1 for camera-shake in #767. When shutter speed TV is lower than the limited shutter speed TVf1 in #767, it sets the limited shutter speed TVf1 as controlling shutter speed TVc in #769 and then proceeds to #770. When shutter speed TV is equal to or higher than the limited shutter speed TVf1 in #767, it sets the shutter speed TV evaluated by the calculation as controlling shutter speed TVc in #768 and thereafter proceeds to #800. In #770, microcomputer μC1 calculates aperture value AV by subtracting controlling shutter speed TVc from exposure value EV. Microcomputer μC1 sets as controlling aperture value AVc, full open aperture value AVo when this aperture value AV is lower than full open aperture value AVo, or sets maximal aperture value AVmax when exceeding maximal aperture value AVmax, and sets the calculated aperture value AV in neither of the above two cases, and thereafter proceeds to #800 (#775–#795). In #800, microcomputer μC1 sets film sensitivity SV to SV=SV+1, the amount of flashlight to a value lower than a suitable value by 1EV, and then in #805 sets a flag FLF showing the flash photography, and thereafter makes a return.

Returning to the flow of FIG. 12, when shutter speed TV is equal to or higher than limited shutter speed TVf2 in #455, determination is made whether or not a brightness value BV is lower than 5 in #460. If brightness value BV is lower than 5 in #460, microcomputer μC1 executes the subroutine of flash photography FL2 described above to carry out a control which provides a contrast by employing flashlight in #480, and then makes a return. Meanwhile, if brightness value BV is equal to or higher than 5 in #460, microcomputer μC1 sets the shutter speed TV evaluated as controlling shutter speed TVc and sets the aperture value AV evaluated as controlling aperture value AVc and, thereafter making a return (#465, #470).

In case where the interchangeable lens is not the camera-shake correction lens in #400, the subroutine of AV, TV calculation (2) (see FIG. 14) is executed (#425). In this subroutine, microcomputer μC1 evaluates aperture value AV by AV=EV/2−TVf1+AVo in #660 and then proceeds to #620. Since the subsequent steps have already been described, a description thereof will not be repeated. After evaluating the aperture value AV and shutter speed TV in #425, determination is made whether or not brightness value BV is lower than 5 in #430. If brightness value BV is lower than 5 in #430, microcomputer μC1 executes the subroutine of flash photography FL2 in 480 and then makes a return. When the brightness value is equal to or higher than 5 in #430, determination is made whether or not shutter speed TV is lower than limited shutter speed TVf1 in #435. If shutter speed TV is lower than limited shutter speed TVf1 in #435, microcomputer μC1 executes the subroutine of flash photography FL2 in #480 and then makes a return. If shutter speed TV is equal to or higher than limited shutter speed TVf1 in #435, microcomputer μC1 sets the evaluated shutter speed TV and aperture value EV as controlling shutter speed TVc and controlling aperture value AVc, respectively, and then makes a return (#465, #470). A surrounding light photography is carried out in this case.

Figure 13:
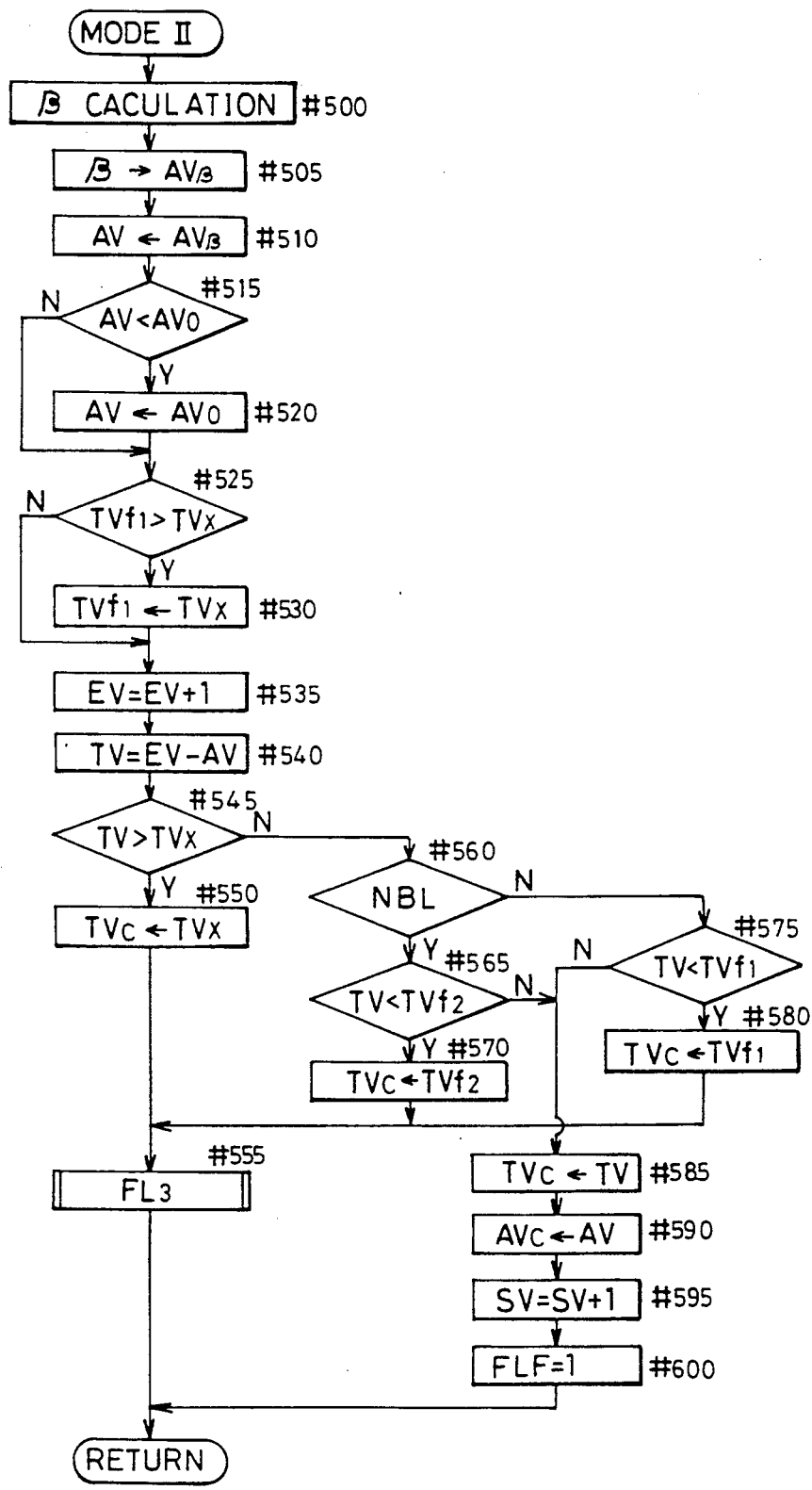
FIG. 13 is a flow chart showing the detailed contents of a routine in mode II of FIG. 11.

FIG. 13 shows the contents of the subroutine of mode II (portrait photographing mode). When this subroutine is called, microcomputer μC1 first evaluates photographing magnification β (the size of a main object occupying a photographing plane) from distance data inputted from the lens and focal length data (#500). Based on a graph shown in FIG. 36, microcomputer μC1 then evaluates an aperture value AVβ from data table with photographing magnification β set as address to set the evaluated aperture value AVβ to be a calculation aperture value AV (#505, #510). Next, determination is made whether or not this calculation aperture value AV is lower than full open aperture value AVo (#515). If calculation aperture value AV is lower than full open aperture value AVo, microcomputer μC1 sets full open aperture value AVo as calculation aperture value AV in #520. If calculation aperture value AV is equal to or higher than full open aperture value AVo, microcomputer μC1 skips #520. The program then proceeds to #525 in both cases. In the portrait photographing mode, determination is made whether limited shutter speed TVf1 exceeds flash synchronized maximal speed TVx in #525 to carry out flash photography. When limited shutter speed TVf1 exceeds flash synchronized maximal speed TVx, flash synchronized maximal speed TVx is set as limited shutter speed TVf1 in #530. If not, microcomputer μC1 skips #530. The program then proceeds to #535 in both cases. In #535, exposure value EV is set to EV=EV+1 so that the background may be lowered by 1EV. In #540, shutter speed TV is evaluated by TV=EV−AV. In #545, determination is made whether or not the evaluated shutter speed TV exceeds flash synchronized maximal speed TVx. When shutter speed TV exceeds flash synchronized maximal speed TVx, microcomputer μC1 sets flash synchronized maximal speed TVx as controlling shutter speed TVc in #550 and then executes a subroutine of a flash photography FL3 in #555, thereafter making a return. The subroutine of flash photography FL3 is a flow in and after #770 of FIG. 16. Here, aperture value AV is re-determined because the exposure value is not appropriate with the above described aperture value AV=AVβ. Meanwhile, if a calculation shutter speed TV is equal to or lower than flash synchronized maximal speed TVx in #545, microcomputer μC1 proceeds to #560 to determine whether or not the interchangeable lens is camera-shake correction lens NBL. If the interchangeable lens is the camera-shake correction lens in #560, determination is made whether calculation shutter speed TV is lower than limited shutter speed TVf2 for camera-shake in #565. If calculation shutter speed TV is lower than limited shutter speed TVf2 in #565, microcomputer μC1 sets limited shutter speed TVf2 as controlling shutter speed TVc in #570 and then executes the subroutine of flash photography FL3 in #555. When calculation shutter speed TV is equal to or higher than limited shutter speed TVf2 is #565, calculation shutter speed TV is set as controlling shutter speed TVc and calculation aperture value AV as controlling aperture value AVc (#585, #590). Further, setting film sensitivity SV to be SV=SV+1, the amount of flashlight is lowered by 1 EV (#595). Then, microcomputer μC1 sets flag FLF to indicate the flash photography and then makes a return (#600). In case where the interchangeable lens is not the camera-shake correction lens in #560, determination is made whether calculation shutter speed TV is lower than limited shutter speed TVf1 in #575. If calculation shutter speed TV is lower than limited shutter speed TVf1 in #575, microcomputer μC1 sets limited shutter speed TVf1 as controlling shutter speed TVc in #580 to execute the subroutine of flash photography FL3 in #555. If calculation shutter speed TV is equal to or higher than limited shutter speed TVf1 in #575, microcomputer μC1 executes the processings in #585–#600 and then makes a return.

Description will now be given on the subroutine of mode III (scenery photographing mode) with reference to FIG. 14. When this subroutine is called, microcomputer μC1 first calculates shutter speed TV by TV=EV−AV in #604, setting aperture value AV to be AV =7 in #602. Then, determination is made whether the interchangeable lens is camera-shake correction lens NBL in #605. If the interchangeable lens is the camera-shake correction lens in #605, determination is made whether TV≧TVff2 in #606. Unless TV≧TVf2, aperture value AV is calculated by AV=EV−TVf2+AVo in #610. Unless the interchangeable lens is the camera-shake correction lens in #605, determination is made whether TV≧=TVf1 in #608. Unless TV≧=TVf1, microcomputer μC1 calculates aperture value AV by AV=EV −Tvf1+AVo in #615. The program then proceeds to #620 in both cases. Since the processings in and after #620 (a control for surrounding light photography) has already been described above, description thereof will not be repeated. When TV≧=TVf2 in #606 or when TV≧=TVf1 in #608, the program proceeds to #645.

Figure 17:
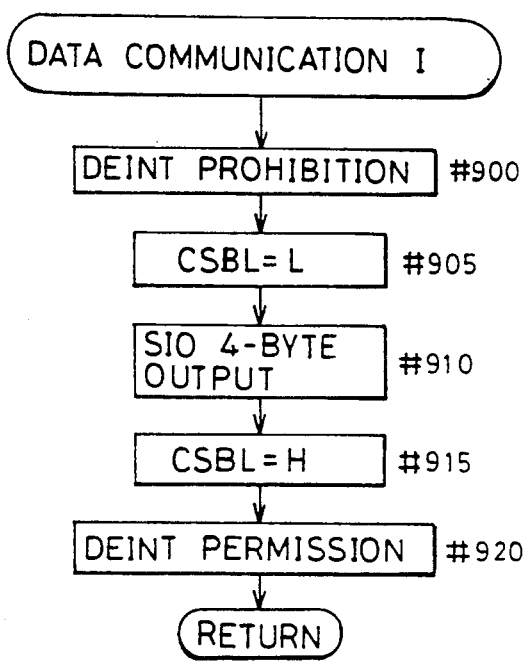
FIG. 17 is a flow chart showing the detailed contents of a routine of a data communication I of FIG. 4.

Returning to the flow of FIG. 4, after executing the subroutine of AE calculation in #45, microcomputer μC1 executes a subroutine of a data communication I in #50 so as to output data to camera-shake detecting apparatus BL. The subroutine of data communication I is shown in FIG. 17. When this subroutine is called, microcomputer μC1 prohibits an interruption DEINT from camera-shake detecting apparatus BL and makes terminal CSBL attain the low level to carry out serial communication four times (4 bytes) to output the 4-byte data to camera-shake detecting apparatus BL (#900–#910). This 4-byte data includes focal length f, controlling shutter speed TVc, the type of lens and the presence/absence of in-focus. After outputting the data, microcomputer μC1 causes terminal CSBL to attain the high level, then permits interruption DEINT from camera-shake detecting apparatus BL and thereafter makes a return (#915, #920).

Microcomputer μC2 of camera-shake detecting apparatus BL executes the program of an interruption CSBL when receiving a signal which changes from the high level to the low level through terminal CSBL of microcomputer μC1. This will be explained with reference to FIG. 21 as follows. Microcomputer μC2 inputs the 4-byte data by data communication I and sets a flag DTF indicating that data communication I was executed, and thereafter makes a return (#1105, #1110).

The detailed structure of camera-shake detecting apparatus BL will now be described.

Figure 40:
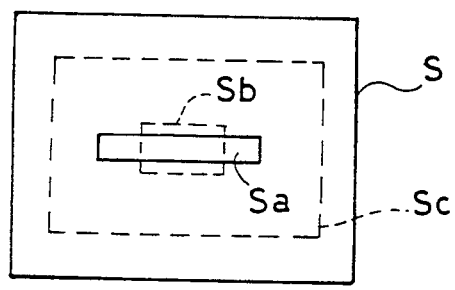
FIG. 40 is a descriptive diagram showing a photographing plane according to one embodiment of the present invention.

FIG. 40 shows a range of camera-shake detection (blurring detection) occupying a photographing plane S. In the figure, the symbol Sa denotes a distance measuring range measured by light receiving circuit $AF_{CT}$ for focus detection; Sb denotes a range of camera-shake detection (blurring detection) detected by camera-shake detecting apparatus BL; and Sc denotes a light measuring range measured by light measuring circuit LM.

Figure 41:
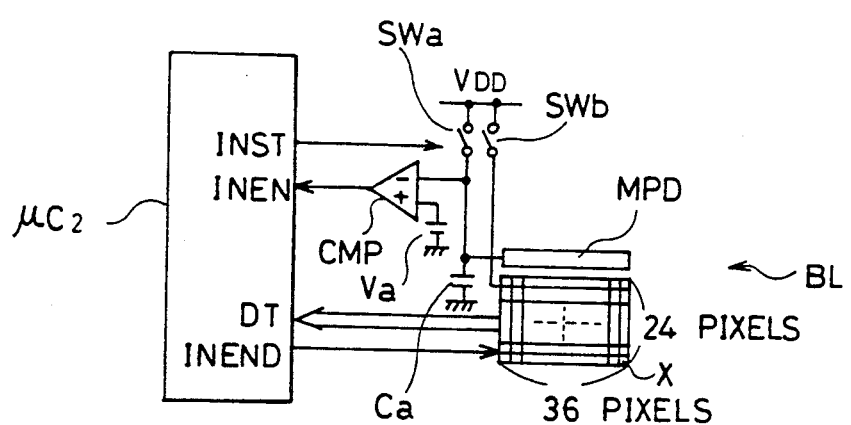
FIG. 41 is a circuit diagram of a camera-shake detecting apparatus employed in one embodiment of the present invention.

FIG. 41 is a block circuit diagram of camera-shake detecting apparatus BL. Microcomputer μC2 performs a calculation for camera-shake detection and a sequence control thereof (especially a data communication with microcomputer μC1 and an accumulation control of a CCD area sensor X). A two-dimensional CCD area sensor X includes 24 pixels in a longitudinal direction and 36 in a lateral direction with the same ratio as the size of a 35 mm film. Each pixel has a photosensitive portion, storage portion and transfer portion. A charge stored in the storage portion varied dependently on a photocurrent obtained in the photosensitive portion. The storage charge obtained in the storage portion of each pixel is serially read by the transfer portion to be inputted to a data entry portion DT of microcomputer μC2. An A/D converting portion is provided in a data entry portion DT of a microcomputer μC3 for converting an analog signal outputted from CCD area sensor X to a digital signal to store the converted signal into a built-in memory. A photosensitive element MPD for monitoring, switch elements SWa, SWb, a condenser Ca and a comparator CMP are provided to control an accumulation time of CCD area sensor X. A terminal INST serves to output an accumulation start signal which attains the high level for a predetermined time period to turn off switch elements SWa, SWb for a predetermined time period. With switch element SWa to be turned on for a predetermined time, an initial voltage of condenser Ca is set to a supply voltage $V_{DD}$. Meanwhile, with switch element SWb to be turned on for a predetermined time, an initial voltage of the storage portion in each pixel of the CCD area sensor is set to supply voltage $V_{DD}$. A terminal INEN serves to input an accumulation end signal. When a voltage of condenser Ca discharged by a photocurrent of photosensitive element MPD becomes equal to or lower than a reference voltage Va after switch elements SWa, SWb are turned off, an output of comparator CMP attains the high level, which results in the accumulation end signal. A terminal INEND is a terminal for outputting an accumulation end signal, through which a signal for ending the accumulation operation of CCD area sensor X is outputted when the output of comparator CMP attains the high level or when a predetermined time period passes.

Figure 20:
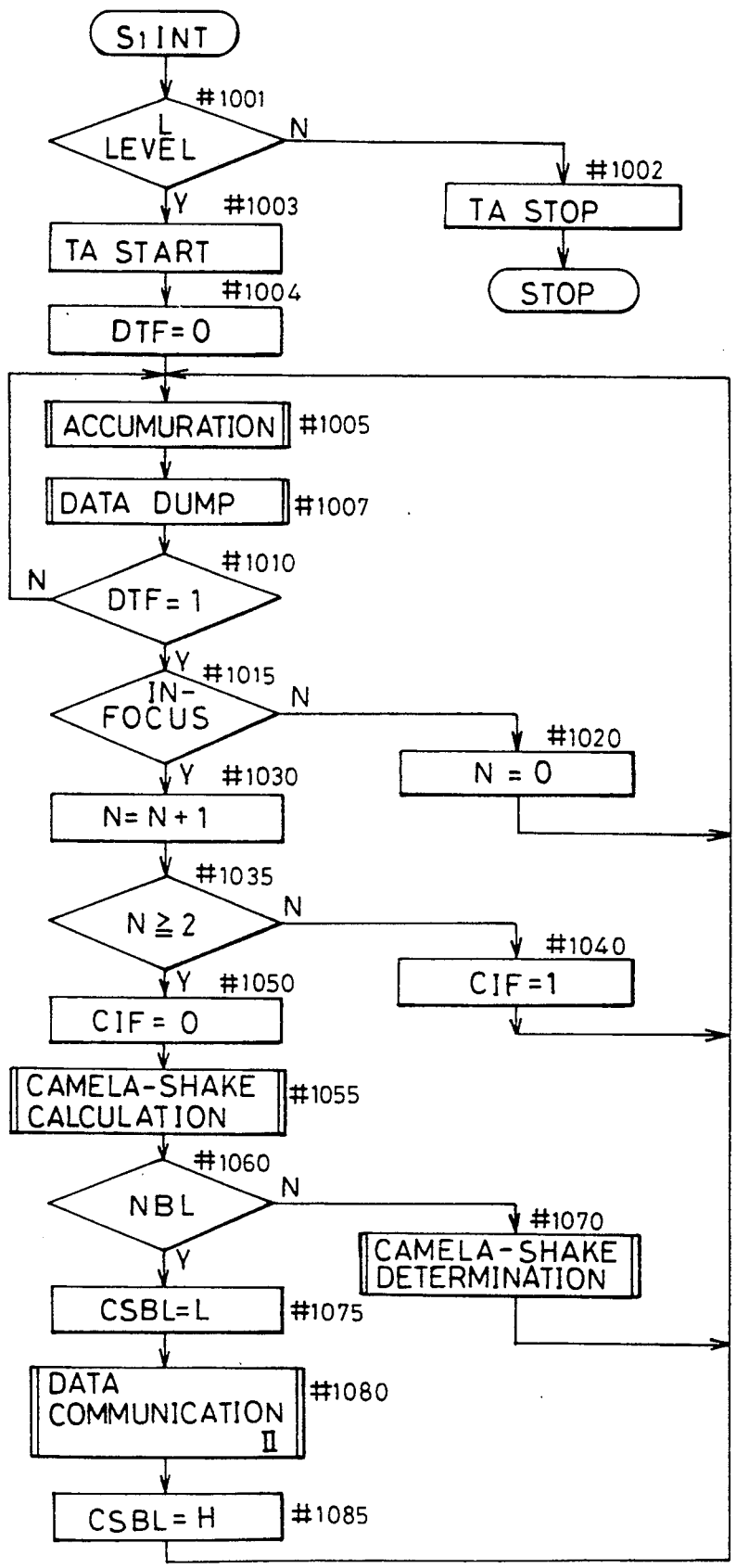
FIG. 20 is a flow chart showing the detailed contents of a routine of SlINT according to one embodiment of the present invention.

The contents of a flow chart of microcomputer μC2 for controlling this camera-shake detecting apparatus BL are shown in FIG. 20. When microcomputer μC1 outputs a signal which changes from the high level to the low-level or from the low level to the high level to an interruption input terminal SIINT of microcomputer μC2, microcomputer μC2 executes an interruption of SIINT shown in FIG. 20. First, microcomputer μC2 determines whether interruption input terminal SIINT is at the low level or not by detecting the level of an input terminal P1 of microcomputer μC2 in #1001. In case where determination is made that interruption input terminal SIINT is at the high level in #1001, microcomputer μC2 stops a free-running timer TA in #1002 to be put in a stopped state, determining that the photographing of the camera is completed. In case where determination is made that interruption input terminal SIINT is at the low level in #1001, microcomputer μC2 starts free-running timer TA in #1003. This free-running timer TA keeps operating until the photographing of the camera ends. Then, determining that the photographing of the camera is started, microcomputer μC2 resets a flag DTF indicating data communication I in #1004 and then executes the subroutine of accumulation control of CCD area sensor X in #1005.

Figure 22:
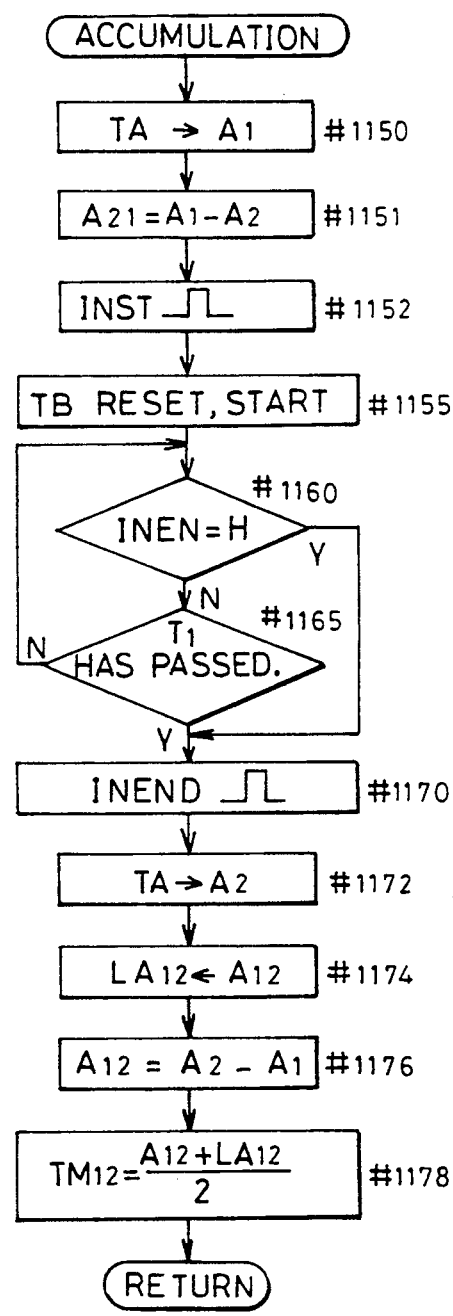
FIG. 22 is a flow chart showing the detailed contents of a routine of accumulation according to one embodiment of the present invention.

The contents of the subroutine of accumulation control are shown in FIG. 22. When the subroutine is called, microcomputer μC2 first reads an accumulation start time from free-running timer TA and then stores the read time as A1 to evaluate a time period A21 required from the previous accumulation end time to the present accumulation start time by A21=A1-A2 (#1150, #1151). Then, microcomputer μC2 causes accumulation start signal outputting terminal INST to attain at the high level for a definite time period to turn on switch elements SWa and SWb for a definite time period, so that condenser Ca discharged by the photocurrent of monitoring light receiving element MPD is reset to supply voltage $V_{DD}$, and also the storage portion of each pixel of two-dimensional CCD area sensor X is reset to supply voltage $V_{DD}$ With terminal INST to attain the low level after a definite time period, microcomputer μC2 turns off switch elements SWa and SWb to start accumulation (#1152). Then, a timer TB is reset and started in #1155. In #1160, microcomputer μC2 waits for terminal INEN for detecting the end of accumulation to attain the high level. When terminal INEN attains the high level, it moves to #1170 so as to end the accumulation. Unless terminal INEN attains the high level in #1160, microcomputer μC2 waits for timer TB to count a predetermined time T1 in #1165 and, when predetermined time T1 has passed, proceeds to #1170 so as to end the accumulation. If predetermined time T1 has not passed, it returns to #1160. In #1170, microcomputer μC2 causes terminal INEND to attain the high level for a moment and then transfers the charge stored in the storage portion of each pixel in CCD area sensor X to the transfer portion. With the accumulation completed, microcomputer μC2 reads an accumulation end time from free-running timer TA to store the read time as A2 and store the previously calculated accumulation time period A12 as LA12 (#1172, #1174). Then, microcomputer μC2 evaluates the present accumulation time period A12 by A12=A2−A1 and evaluates an arithmetic mean TM12 of the present accumulation time period and the previous accumulation time period by TM12=(A12+LA12)/2, thereafter making a return (#1176, #1178). The meaning of this calculation will be described later.

At the time when the accumulation of CCD area sensor X ends in #1005 of FIG. 20, a charge is stored in the storage portion of each pixel of CCD area sensor X according to the brightness value of each pixel. Next, microcomputer μC2 executes a subroutine of data dump in #1007. Microcomputer μC2 dumps charge information (accumulation data) stored for each pixel of CCD area sensor X, then converts the dumped data to digital data in an internal A/D converter to store the same.

Figure 23:
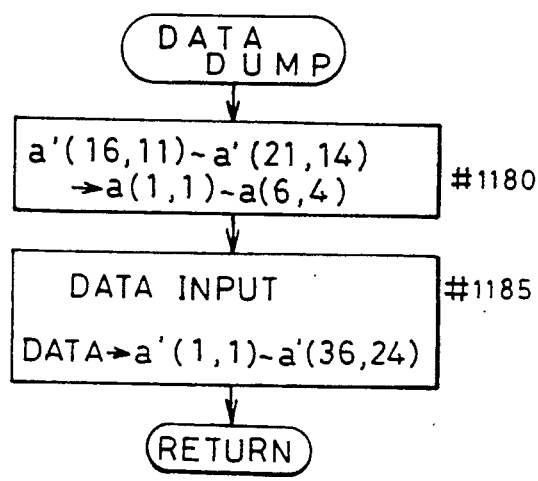
FIG. 23 is a flow chart showing the detailed contents of a routine of data dump according to one embodiment of the present invention.
Figure 42:
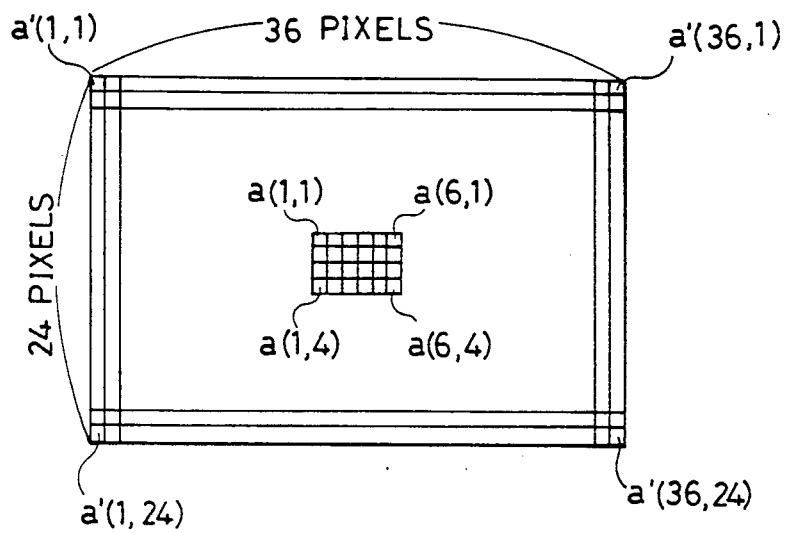
FIG. 42 is a descriptive diagram showing the structure of a CCD area sensor employed in the detecting apparatus of FIG. 41.

The contents of the subroutine of this data dump are shown in FIG. 23. When this subroutine is called, image data a' (16, 11) to a, (21, 14) of a central portion of the image area out of previously inputted image data are stored over again as data a (1,1) to a (6, 4) to set the data to be basic part data (#1180). Then, the A/D-converted present image data is stored as data a' (1, 1) to a' (36, 24) to set the same to be reference part data (#1185). FIG. 42 shows the relation between basic part a (1, 1) to a (6, 4) and reference part a (1, 1) to a'(36, 24).

Figure 21:
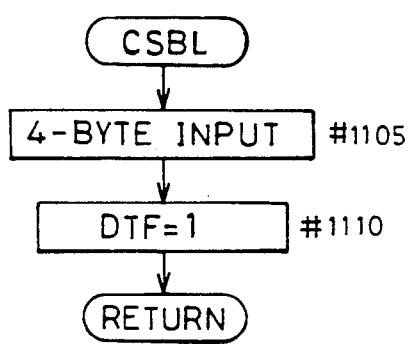
FIG. 21 is a flow chart showing the detailed contents of a routine of CSBL according to one embodiment of the present invention.

After completing the execution of the subroutine of data dump in #1007 of FIG. 21, microcomputer μC2 determines whether or not flag DTF indicating data entry is set in #1010 and, unless the flag is set, returns to #1005 to carry out the accumulation and the data dump over again. When flag DTF is set in #1010, determination is made based on input data from microcomputer μC1 whether the focusing state is in-focus or not. Unless the image is in-focus, microcomputer μC2 sets a variable N to 0 and then returns to #1005 to carry out the accumulation and the data dump over again (#1015, #1020).

The reason why camera-shake detection (blurring detection) is not carried out when the focusing state is not in-focus is that comparison between two images which are out-of-focus with a deviation in time causes the following problems:

(i) With a low contrast, it is impossible to obtain accurate image data or carry out accurate camera-shake detection even though comparing the two images, resulting in a decrease in precision of camera-shake detection.

(ii) When a photographic lens is driven to bring the object into focus, it sometimes happens that a change occurs in image, and hence an image blurring is detected although it is not actually caused by camera-shake.

Meanwhile, in case of the in-focus state in #1015, microcomputer μC2 adds 1 to variable N to make determination whether this variable N is equal to or higher than 2. If variable N is lower than 2, microcomputer μC2 sets a correction forbidding flag CIF so as to forbid camera-shake correction, then proceeds to #1005 (#1030-#1040). This is possible because at least image data to be the basic part and the one to be the reference part are required to carry out camera-shake detection (blurring detection) and to this end, variable N must be equal to or higher than 2. When variable N is equal to or higher than 2 in #1035, microcomputer μC2 resets correction forbidding flag CIF in #1050 so as to permit the camera-shake correction, then executes a subroutine of a camera-shake amount calculation in #1055.

Figure 24:
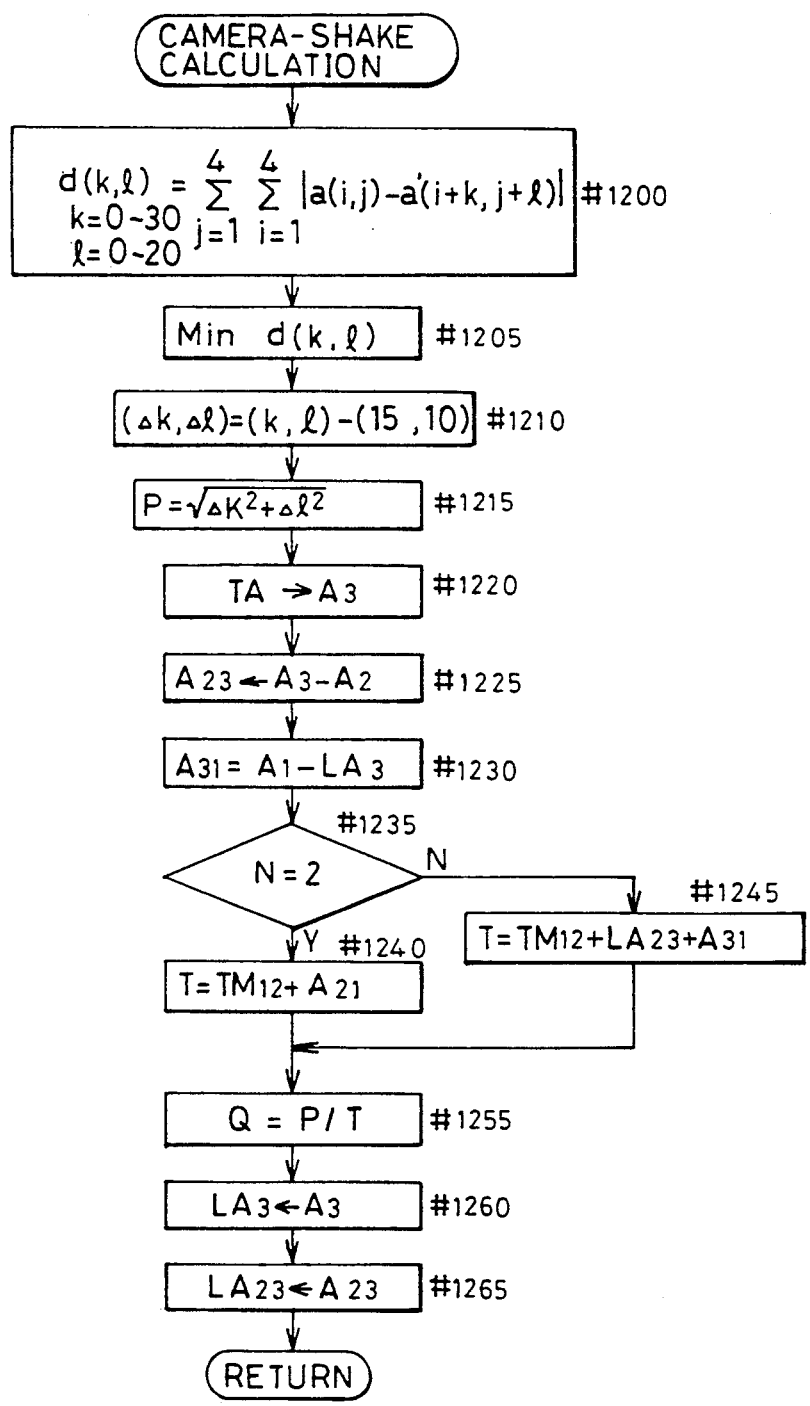
FIG. 24 is a flow chart showing the detailed contents of a routine of camera-shake calculation according to one embodiment of the present invention.

The subroutine of calculation of the amount of camera-shake is shown in FIG. 24. When this subroutine is called, a correlating function $$d(k, l) = \sum_{j=1}^{4} \sum_{i=1}^{6} |a(i, j) - a'(i + k, j + l)|$$

is first calculated with respect to k=0, 1, ..., 30, =0, 1, ..., 20 (#1200). This means a comparison of image data a (i, j) of the basic part with image data a' (i+k, j +l) of a partial area in the reference part of the same size as the basic part. By calculating the above described correlating function d (k,l) with respect to k=0, 1, ..., 30, =0, 1, ..., 20, the image data of the basic part is compared with that of the reference part while being shifted one by one pixel in each of lateral and longitudinal directions with respect to the reference part. Next, the minimal value of the correlating function d (k,l) is evaluated to evaluate the shifted amount (k,l) which provides this minimal value (#1205). As shown in FIG. 42, the shifted amount (k,l) when the image data a (i, j) of the basic part is coincident with the image data of the partial area, of the same size as the basic part, in the central portion of the reference part is (15, 10). Accordingly, the direction of deviation (vector) when the image data a (i, j) of the basic part is coincident with the image data of the partial area, of the same size as the basic part, at an arbitrary position in the reference part is evaluated as $(\Delta k, \Delta l) = (k,l) - (15,10)$, and the deviation is calculated as $P = (\Delta k^2 + \Delta l^2)^{\frac{1}{2}}$ (#1210, #1215). After the foregoing calculation, microcomputer μC2 reads a calculation end time from free-running timer TA to store the read time as A3. Microcomputer μC2 then calculates a time period A23 from accumulation end time A2 calculation end time A3 as A23=A3−A2 to evaluate a time period A31 from the previous calculation end time LA3 to the present accumulation start time A1 (#1220-#1230). Thereafter, determination is made whether or not N=2 in #1235. When N=2, a time period T from the previous central time of accumulation to the present central time of accumulation is calculated as T=TM12+A21. Unless N =2, the time period T is calculated as T=TM12+LA23+A31 (#1240, #1245).

The time period T will now be described with reference to FIG. 43.

Figure 43:
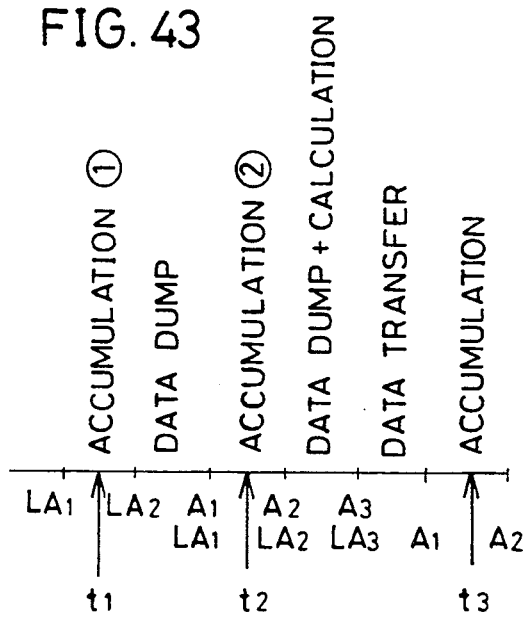
FIG. 43 is a diagram for describing operations according to one embodiment of the present invention.

First of all, when N=2, as apparent from the flow chart of FIG. 20, it follows the course of accumulation, data dump, accumulation, data dump and calculation, and the time period T from the previous central time to the present central time is a period from t1 to t2 of FIG. 43. Assuming that the time point t1 when an image is formed by the previous accumulation is the previous central time, a time period from that time point t1 to the previous accumulation end time is (LA2−LA1)/2 =LA12/2, namely, half the previous accumulation time period. The previous data dump time period becomes A21=A1−LA2 (A2 in the flow chart). Assuming that the time point t2 when an image is formed by the present accumulation is the present central time, a time period from the present accumulation starting time to the present central time t2 becomes A12/2 =(A2−A1)/2, which is half the present accumulation time period. Accordingly, the time period T from the previous control time to the present central time becomes T=(A12 +LA12)/2+A21=TM12+A21.

Next, when N>2, a time period required for the calculation and a time period required for the data transfer (a time period during which data is outputted from microcomputer μC2 of camera-shake detecting apparatus BL to microcomputer μC1) are inevitably required. Accordingly, the time period T from the previous central time to the present central time is a period from t2 to t3 of FIG. 43, which is evaluated as T=(LA2−LA1)/2+(LA3 −LA2)+(A1−LA3)- +(A2−A1)/2=TM12+LA23+A31.

Then, microcomputer μC2 divides the camera-shake amount P thus obtained by a time interval which obtains image data for camera-shake detection, to evaluate the amount of camera-shake per unit time, namely, a camera-shake speed Q=P/T (#1255). Then, microcomputer μC2 stores the previous calculation end time A3 as LA3 and stores the time period A23 from the previous accumulation end time A2 to the calculation end time A3 as LA23, thereafter making a return (#1260, #1265).

After the execution of the subroutine of the camera-shake amount calculation in #1055 of FIG. 20, microcomputer μC2 makes determination whether or not the interchangeable lens is camera-shake correction lens NBL in #1060. In case where the interchangeable lens is not the camera-shake correction lens in #1060, microcomputer μC2 executes a subroutine of camera-shake determination in #1070 to determine whether a camera-shake is liable to occur, and then returns to #1005. In case where the interchangeable lens is the camera-shake correction lens in #1060, it proceeds to #1075. In #1075, microcomputer μC2 causes terminal CSBL to attain the low level to carry out an interruption for data transfer to microcomputer μC1. Microcomputer μC2 then executes a subroutine of a data communication II to output 6-byte data (deviation k, l, a camera-shake warning signal, an accumulation time TI, camera-shake speed Q, a correction starting signal, a sum T of accumulation time and calculation time) to microcomputer μC1 in #1080. Thereafter, it causes terminal CSBL to attain the high level in #1085 and then returns to #1005.

Figure 25:
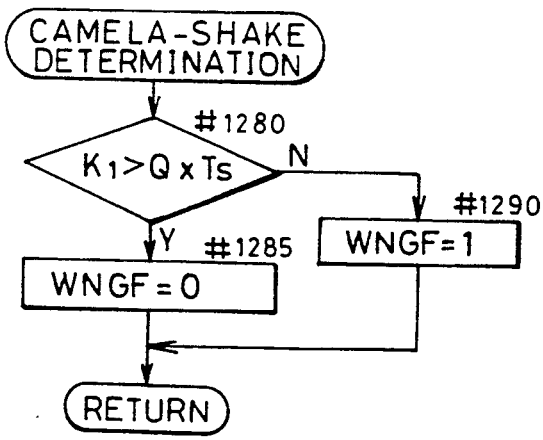
FIG. 25 is a flow chart showing the detailed contents of a routine of camera-shake determination according to one embodiment of the present invention.

Next, the contents of the subroutine of camera-shake determination are shown in FIG. 25. When this subroutine is called, microcomputer μC2 first multiplies camera-shake speed Q by an exposure time Ts (real time) to determine whether or not the evaluated value Q×Ts is lower than a predetermined value K1 (#1280). Accordingly, the amount of camera-shake which occurs during the exposure time is obtained. If the evaluated value is lower than predetermined value K1, microcomputer μC2 resets a flag WNGF for warning a camera-shake, while if the value is equal to or higher than predetermined value K1, it sets flag WNGF and returns (#1285, #1290). In case where the interchangeable lens is the camera-shake correction lens, microcomputer μC3 makes camera-shake determination and correction to transmit a signal indicating the presence/absence of the camera-shake warning to the body. Description will be given later in regard to this point.

Figure 18:
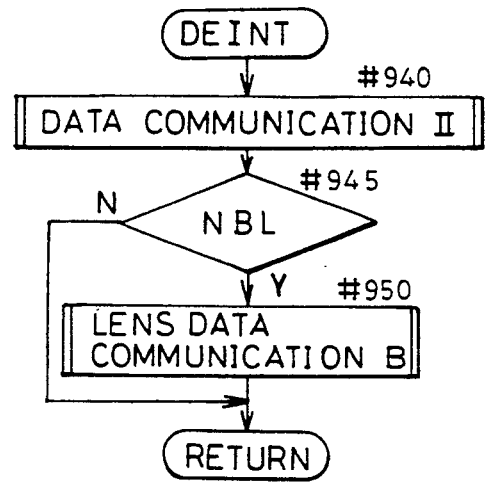
FIG. 18 is a flow chart showing the detailed contents of a DEINT routine according to one embodiment of the present invention.

Description will now be given on the operation of data transfer from camera-shake detecting apparatus BL to microcomputer μC1. Microcomputer μC1 executes interruption DEINT shown in FIG. 18 when terminal CSBL of camera-shake detecting apparatus BL receives a signal which changes from the high level to the low level. In this interruption, microcomputer μC1 first executes the subroutine of data communication II in #940 to receive 6-byte data transmitted from camera-shake detecting apparatus BL. Then, it makes determination whether or not the interchangeable lens is camera-shake correction lens NBL. In case where the interchangeable lens is the camera-shake correction lens, microcomputer μC1 executes the subroutine of lens data communication B in #950 and then makes a return. If not, it skips #950 and then returns.

Figure 19:
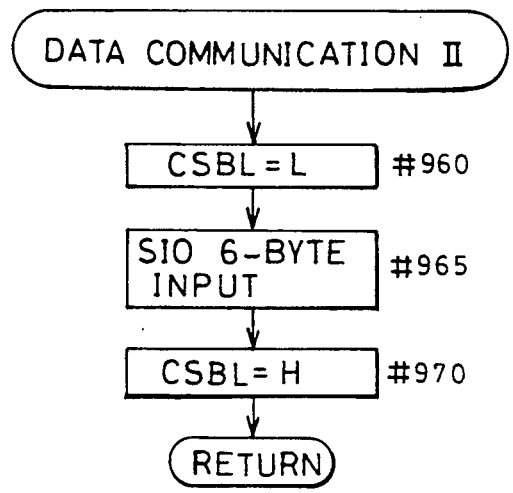
FIG. 19 is a flow chart showing the detailed contents of a routine of a data communication II of FIG. 18.

FIG. 19 shows the contents of the subroutine of data communication II with the above described camera-shake detecting apparatus BL. When this subroutine is called, microcomputer μC1 also causes terminal CSBL to attain the low level. Microcomputer μC1 outputs a clock for serial communication and receives data by 6 bytes which are serially outputted from microcomputer μC2 of camera-shake detecting apparatus BL in synchronization with the output of the clock, and then causes terminal CSBL to attain the high level, thereafter making a return (#960-#970).

Figure 6:
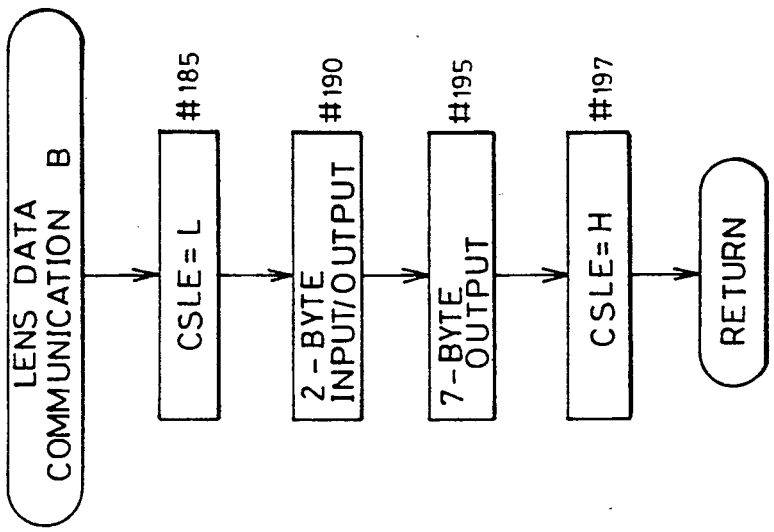
FIG. 6 is a flow chart showing the detailed contents of a routine of a lens data communication B of FIG. 4.

Next, the contents of the subroutine of lens data communication B are shown in FIG. 6. When this subroutine is called, microcomputer μC1 causes terminal CSLE to attain the low level so as to show that a communication between microcomputer μC1 and the lens will be carried out. Then, microcomputer μC1 carries out a serial communication in which microcomputer μC1 receives 2-byte data from the lens and simultaneously outputs the 2-byte data. Thereafter, microcomputer μC1 outputs 7-byte data to cause terminal CSLE to attain the high level, and then ends the data transfer (#185-#197). The 7-byte data includes the amount of camera-shake correction Δk, Δl the presence/absence of a camera-shake correction start signal, the presence/absence of an end signal, the presence/absence of a release signal and the presence/absence of a microcomputer stop signal, a controlling shutter speed, accumulation time TI of the CCD area sensor in camera-shake detecting apparatus BL, a blurring speed Q, and a sum T of accumulation time and calculation time of the CCD area sensor.

Flow charts for a control of microcomputer μC3 (particularly the control of the camera-shake correction lens) will now be explained with reference to FIGS. 27-32. When the lens is mounted on the body to turn lens mounting detection switch $S_{LE}$ from an ON state to OFF state, or alternatively, when a voltage $V_{DD}$ supplied from the body to the lens rises to or higher than an operation voltage, which rise is then detected by a reset circuit REIC, a signal which changes from the low level to the high level is inputted to a reset terminal RE3 of microcomputer μC3. Then, microcomputer μC3 executes a set routine shown in FIG. 27 in which it resets a port and a register and then stops When an interruption occurs from the stopped state, microcomputer μC3 causes an oscillator incorporated therein to automatically start oscillation of a clock. When transferring from an operating state to the stopped state, microcomputer μC3 controls the oscillator to automatically stop the oscillation of the clock.

Figure 28:
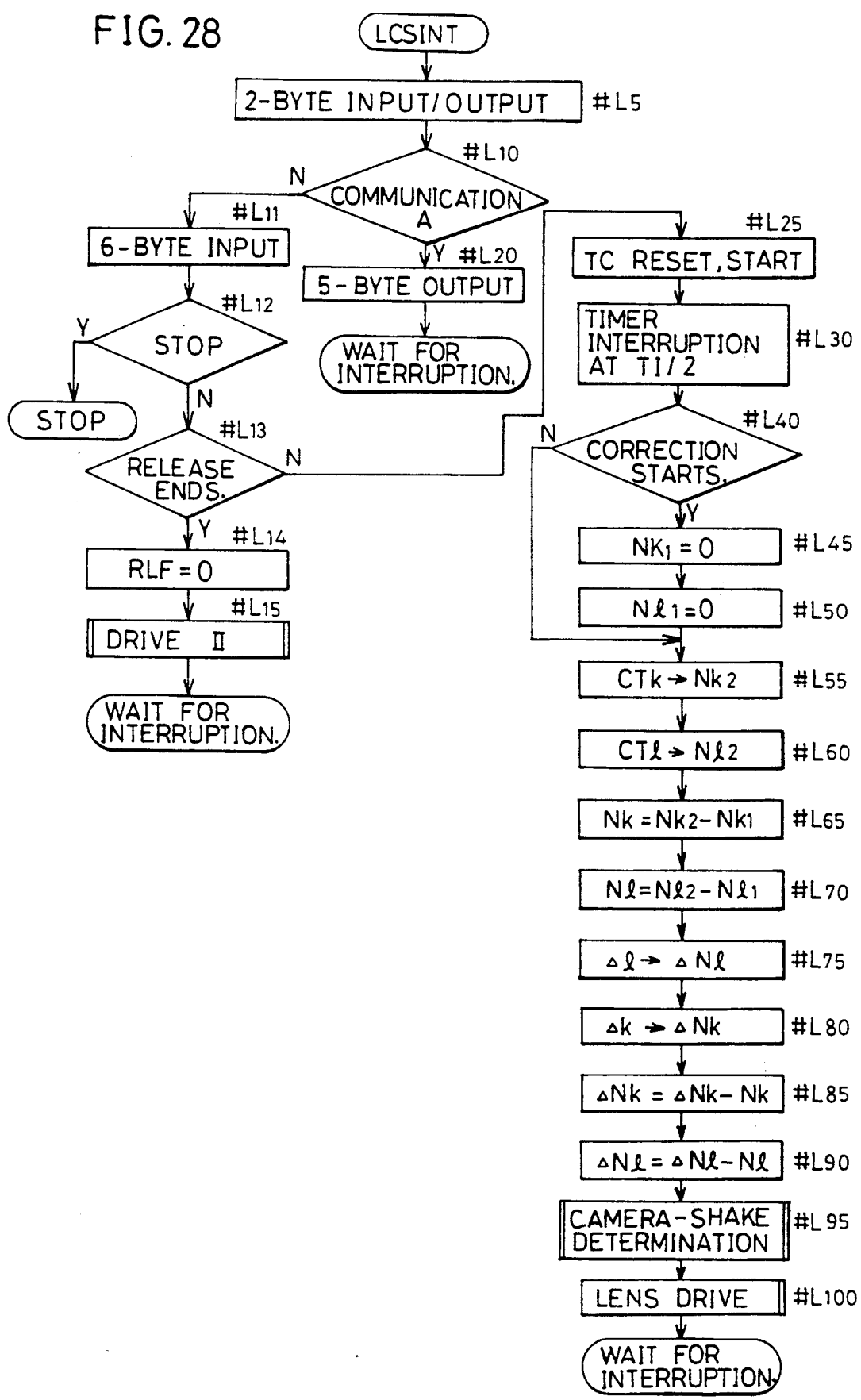
FIG. 28 is a flow chart showing the detailed contents of a routine of LSSINT according to one embodiment of the present invention.

When a signal which changes from the high level to the low level is inputted to terminal CSLE of microcomputer μC3 from microcomputer μC1, an interruption routine LCSINT shown in FIG. 28 is executed. First, microcomputer μC1 inputs/outputs 2-byte data and determines whether or not a body status data ICPB obtained from this data communication is lens data communication A. If the data is lens data communication A, microcomputer μC1 outputs 5-byte data in synchronization with a clock for serial communication and then becomes an interruption waiting state (#L5-#L15).

If the body status is not lens data communication A in #L10, microcomputer μC1 determines that the status is lens data communication B and then proceeds to #L11. In #L11, microcomputer μC1 receives 6-byte data to make determination whether a stop signal of microcomputer μC1 is set or not. When the stop signal is set, microcomputer μC1 stops (#L11, #L12). When the stop signal of microcomputer μC3 is not set, microcomputer μC1 proceeds to #L13 to make determination whether a release is completed or not. A signal for determining whether the release is completed or not is inputted from microcomputer μC1 by lens data communication B at the time when the release is completed (refer to #1325 which will be described later). If the release is completed in #L13, microcomputer μC1 resets a flag RLF indicating that the release is being carried out in #L14, and then executes a subroutine of a drive II in #L15 so as to return the lens shifted for camera-shake correction to an initial position, and to wait for an interruption. If the release is not completed in #L13, the program proceeds to #L25 so as to carry out camera-shake correction while the object distance before exposure being provided. Microcomputer μC1 resets and starts a timer TC in #L25 to set a timer interruption in TI/2, which is half the accumulation time TI in #L30.

Figure 29:
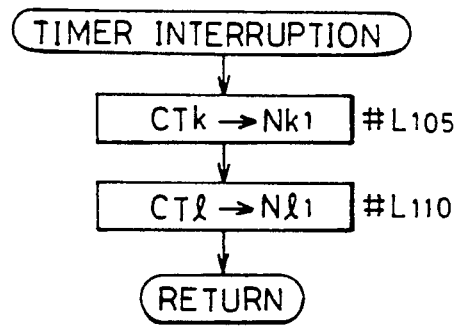
FIG. 29 is a flow chart showing the detailed contents of a routine of timer interruption according to one embodiment of the present invention.
Figure 30:
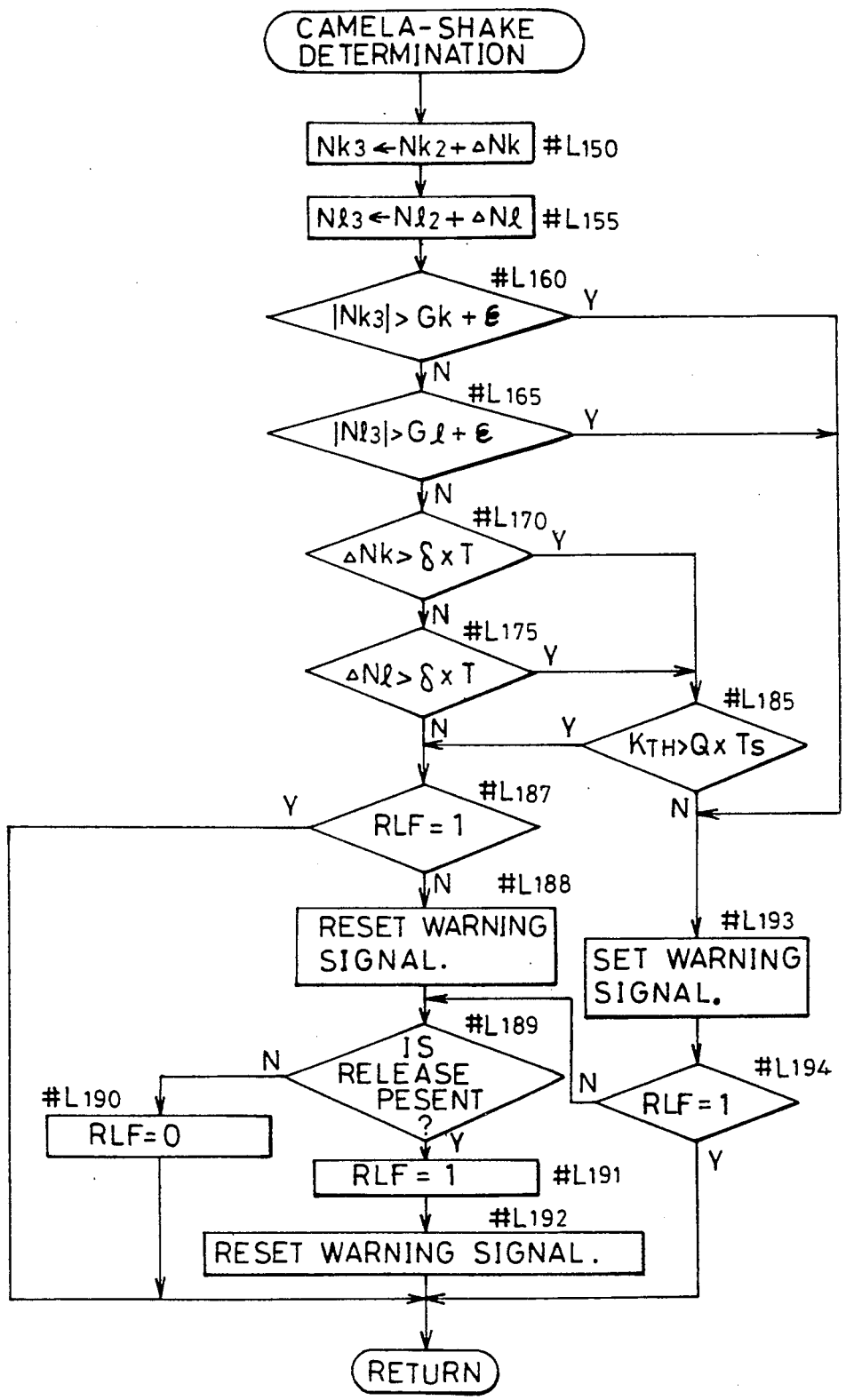
FIG. 30 is a flow chart showing the detailed contents of a camera-shake determination routine of FIG. 28.

FIG. 29 shows the timer interruption which is enabled in #L30. In this timer interruption, microcomputer μC1 reads counters CTk and CTl indicating a lens position to store the read data as Nkl and Nl1, respectively, and thereafter makes a return (#L105, #L110). These counters CTk and CTl are counted up when pulse motors M3 and M4 for driving the camera-shake correction lens make a normal rotation, and counted down when the motors make a reverse rotation. The counters count by their internal hard counters pulses which are outputted from microcomputer μC3 to drive the amount of lens drive represented by ($\Delta$Nk, $\Delta$Nl). Since this timer interruption is executed in half the accumulation time TI (TI/2), (Nkl, Nl1) indicates a lens position in the central time of accumulation.

Microcomputer μC1 then determines whether the correction is to be started in #L40. A signal for determining whether the correction is to be started is inputted from microcomputer μC1 by lens data communication B. If determination is made that the correction is to be started in #L40, microcomputer μC3 sets both variables Nkl and Nl1 indicating the lens position in the central time of accumulation to 0 in #L45, #L50, and thereafter proceeds to #L55. If the correction is not started, microcomputer μC1 skips #L45 and #L50 and then proceeds to #L55. In #L55, microcomputer μC1 reads count values indicating a lens position at the time when the calculation for camera-shake detection ends, from counters CTk and CTl indicating the lens position, then stores the read count values as Nk2 and Nl2, respectively. Then it evaluates the amount of lens movement from the central time of accumulation to the end of the calculation for camera-shake detection by Nk = Nk2 − Nkl and Nl = Nl2 − Nl1, respectively (#L55-#L70). Then, microcomputer $\Delta$C1 evaluates the amount of lens drive $\Delta$Nl, $\Delta$Nk required for the camera-shake correction from data $\Delta$l, $\Delta$k indicating the inputted camera-shake amount, and then subtracts the amount of lens movement Nk, Nl from the central time of accumulation to the end time of camera-shake calculation, from the evaluated amount of lens drive $\Delta$Nl, $\Delta$Nk, to evaluate the actual amount of lens drive $\Delta$Nk, $\Delta$Nl (#L75-#L90)

Figure 44:
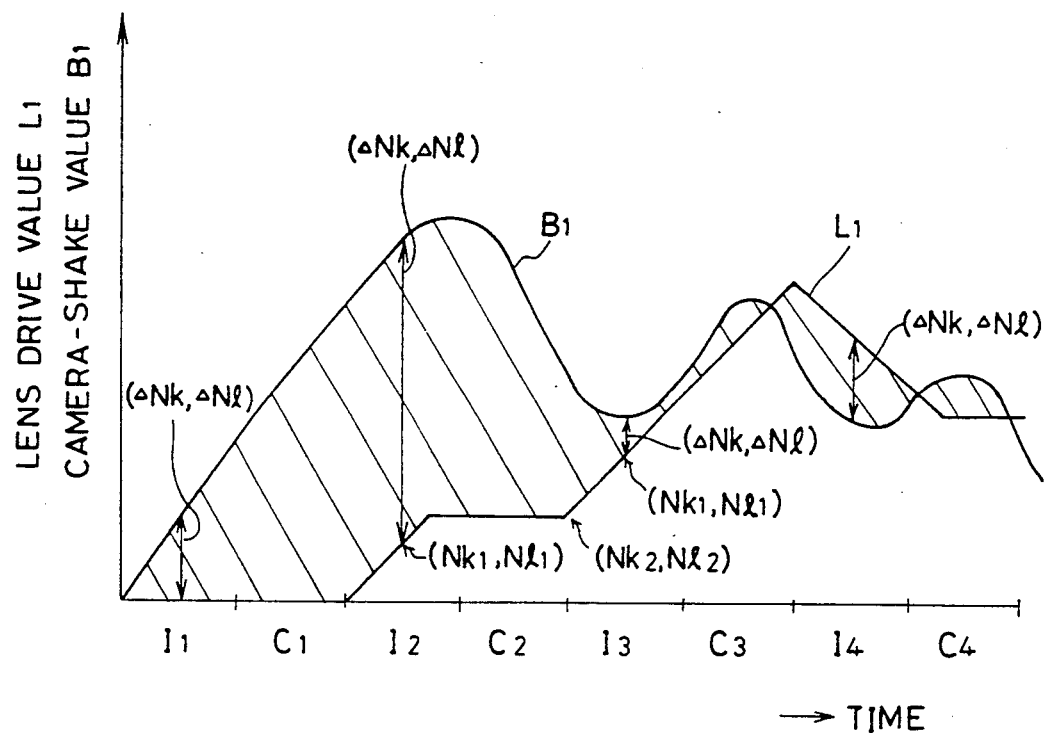
FIG. 44 is a diagram describing the relation between the amount of camera-shake and the amount of lens drive based on an elapse of time according to one embodiment of the present invention.

FIG. 44 is a graph showing the amount of camera-shake and the amount of camera-shake correction lens drive. In the figure, the camera-shake amount P is denoted with the symbol B1, while the amount of lens drive for correcting this camera-shake is denoted with L1. The hatched area between lines B1 and L1 is the amount of camera-shake produced upon driving the camera-shake correction lens. Accumulation time is denoted with I1, I2, I3, I4,..., and calculation time is denoted with C1, C2, C3, C4,... . In the first camera-shake detection, the camera-shake amount ($\Delta$Nk, $\Delta$Nl) obtained by a calculation in a calculation time C1 is the camera-shake amount at the central time of the first accumulation. Based on the amount ($\Delta$Nk, $\Delta$Nl), the camera-shake correction lens is driven. The second accumulation is carried out after calculation time C1. The camera-shake amount ($\Delta$Nk, $\Delta$Nl) obtained by the second calculation is a value at a lens position (Nkl, Nl1). Since a lens position at the time when the second calculation time C2 ends is (Nk2, Nl2), the actual amount of lens drive is obtained by subtracting from the above-described camera-shake amount ($\Delta$Nk, $\Delta$Nl) the amount of lens drive (Nk2 − Nkl, Nl2 − Nl1) by which the lens moves during the period from the central time of the second accumulation time I2 to the end of calculation time C2.

Microcomputer μC3 then executes a subroutine of a camera-shake determination (#L95). This subroutine will be described with reference to FIG. 30. In this subroutine, the next lens position to be driven is evaluated by Nk3 = Nk2 + $\Delta$Nk, Nl3 = Nl2 + $\Delta$Nl (#L150, #L155). Determination is then made whether absolute values |Nk3|, |Nl3| thereof each exceed values obtained by adding an allowable value $\epsilon$ to limit values Gk, $G_L$ for physical correction (a limit that the correction lens hits a lens barrel) (#L160, #L165). When even one of the absolute values |Nk3|, |Nl3| exceeds the predetermined value, microcomputer μC3 proceeds to #L193. Meanwhile, when neither the absolute value |Nk3| nor |Nl3| exceeds the predetermined value in #L160, #L170, microcomputer μC3 determines whether the amount of correction $\Delta$Nk, $\Delta$Nl exceeds a value obtained by multiplying the reference amount $\delta$ of movement per unit time by a sum T of the accumulation time and calculation time required previously (assuming that the brightness is considered approximately the same as the previous brightness and the calculation time is constant) (#L170, #L175). When the correction amount $\Delta$Nk or $\Delta$Nl exceeds $\delta \times$T, microcomputer μC3 determines that the camera-shake correction can not be sufficiently carried out, and then proceeds to #L185. In L185, microcomputer μC3 makes determination whether a value obtained by multiplying camera-shake speed Q by real time Ts of shutter speed is lower than a reference value $K_{TH}$ When the obtained value Q$\times$Ts is higher than reference value $K_{TH}$, the program proceeds to #L193. When the value is lower than reference value KTH, it proceeds to #L187. When the value Q$\times$Ts is lower than $K_{TH}$, no camera-shake warning is made because the camera-shake amount becomes decreased when the real time Ts of shutter speed is short even if the measured camera-shake speed Q is high. In case where the camera-shake amount Q$\times$Ts is lower than reference value $K_{TH}$ in #L185, or where the correction amount $\Delta$Nk, $\Delta$Nl is equal to or lower than $\delta \times$T in #L170, #L175, microcomputer μC3 proceeds to #L187 to make determination whether a flag RLF indicating that the program is under release is set. If flag RLF is set in #L187, it immediately makes a return. This return is made so as not to make a warning signal once set during release be reset. When flag RLF is not set, microcomputer μC3 determines that the program is not under release and then resets a warning signal indicating that the camera-shake is taking place (or fails to be corrected completely) (#L188). Then, determination is made in #L189 whether a release signal is being transmitted from the camera. If the release signal is not being transmitted, microcomputer μC3 resets flag RLF indicating this non-transmission of the release signal and then makes a return (#L190). If the release signal is being transmitted, it sets flag RLF and resets a warning signal, and then makes a return (#L191, #L192). This aims to newly detect whether the camera-shake has occurred during exposure operation. When $K_{TH} \leq$ Q$\times$Ts in #L185, microcomputer μC3 sets a warning signal with a determination that the camera-shake is taking place (or fails to be corrected) and then determines whether flag RLF indicating that the program is under release is set. If the flag is set, it makes a return, but if not, proceeds to #L189 (#L193, #L194).

Figure 31:
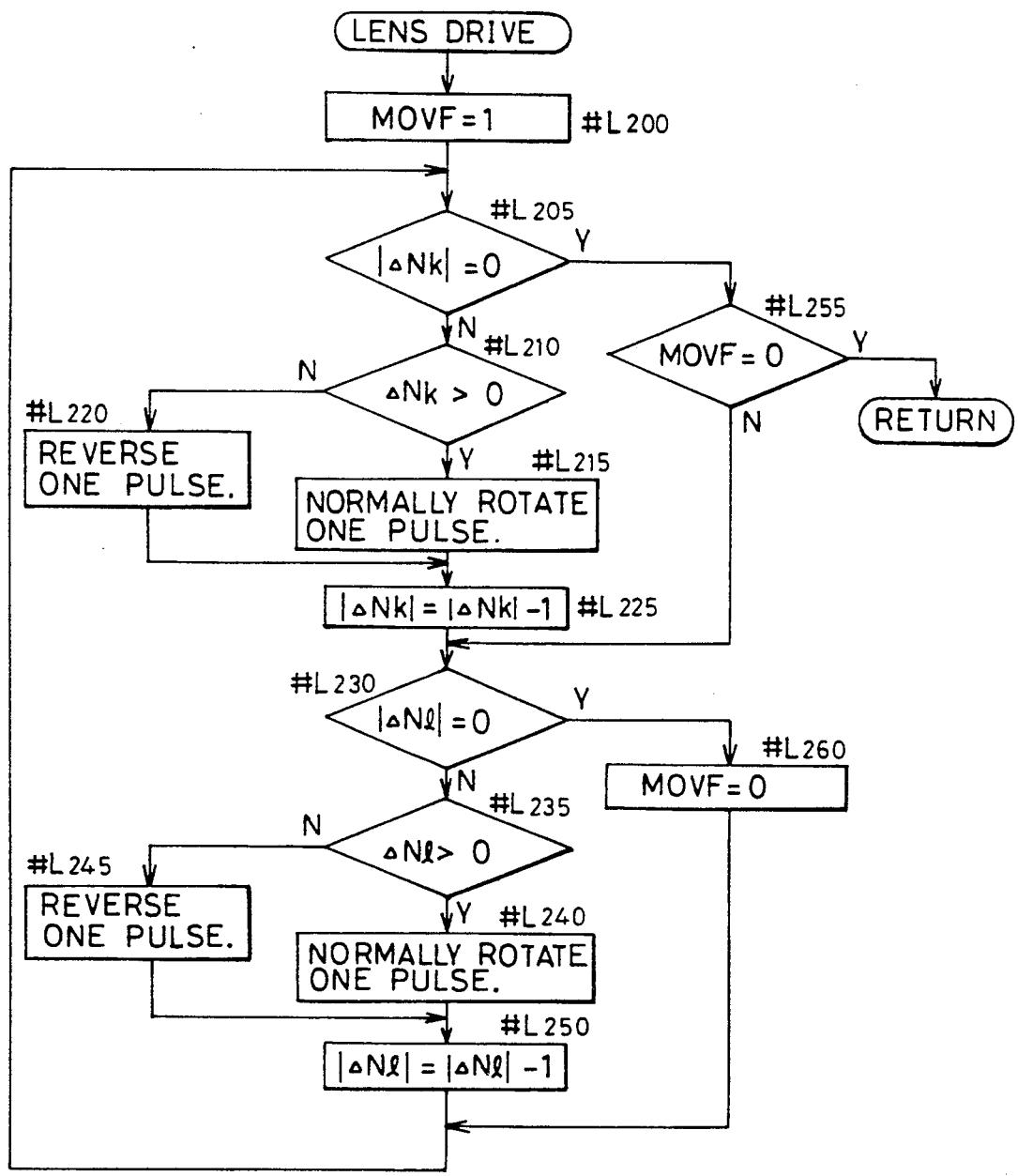
FIG. 31 is a flow chart showing the detailed contents of a lens drive routine of FIG. 28.

After the execution of the subroutine of camera-shake determination in #L95 of FIG. 28, microcomputer μC3 executes the subroutine of lens drive for camera-shake correction in #L100 and becomes a wait-for-interruption state. The contents of the subroutine of lens drive are shown in FIG. 31. Lens driving motors M3 and M4 for camera-shake correction are pulse motors as described above. These motors are driven by one step when microcomputer μC3 transmits one pulse designating a normal rotation or reverse rotation of the motors. First, microcomputer μC3 sets, in #L200, a flag MOVF indicating that the program is under lens drive in an l direction. Then, it makes a determination whether an absolute value |ΔNk| of the lens drive amount in a k direction is 0. If the absolute value is not 0, it determines whether Nk is positive or not. If this value is positive, microcomputer μC3 outputs one drive pulse in the direction of normal rotation, but if not, outputs one drive pulse in the direction of reverse rotation. Then, microcomputer μC3 subtracts 1 from the absolute value |ΔNk| to obtain a new absolute value |ΔNk| (#L205-#L225). If the absolute value |ΔNk| is 0 in #L205, microcomputer μC3 proceeds to #L255 with a determination that the lens drive in the k direction ends, and then determines whether flag MOVF indicating that the program is under lens drive in the l direction is reset. If flag MOVF is reset in #L255, microcomputer μC3 determines that a lens drive in the l direction, which will be described later, is also completed, and then makes a return. If flag MOVF is not reset, it proceeds to #L230. Microcomputer μC3 proceeds to #L230 also from #L225.

Figure 32:
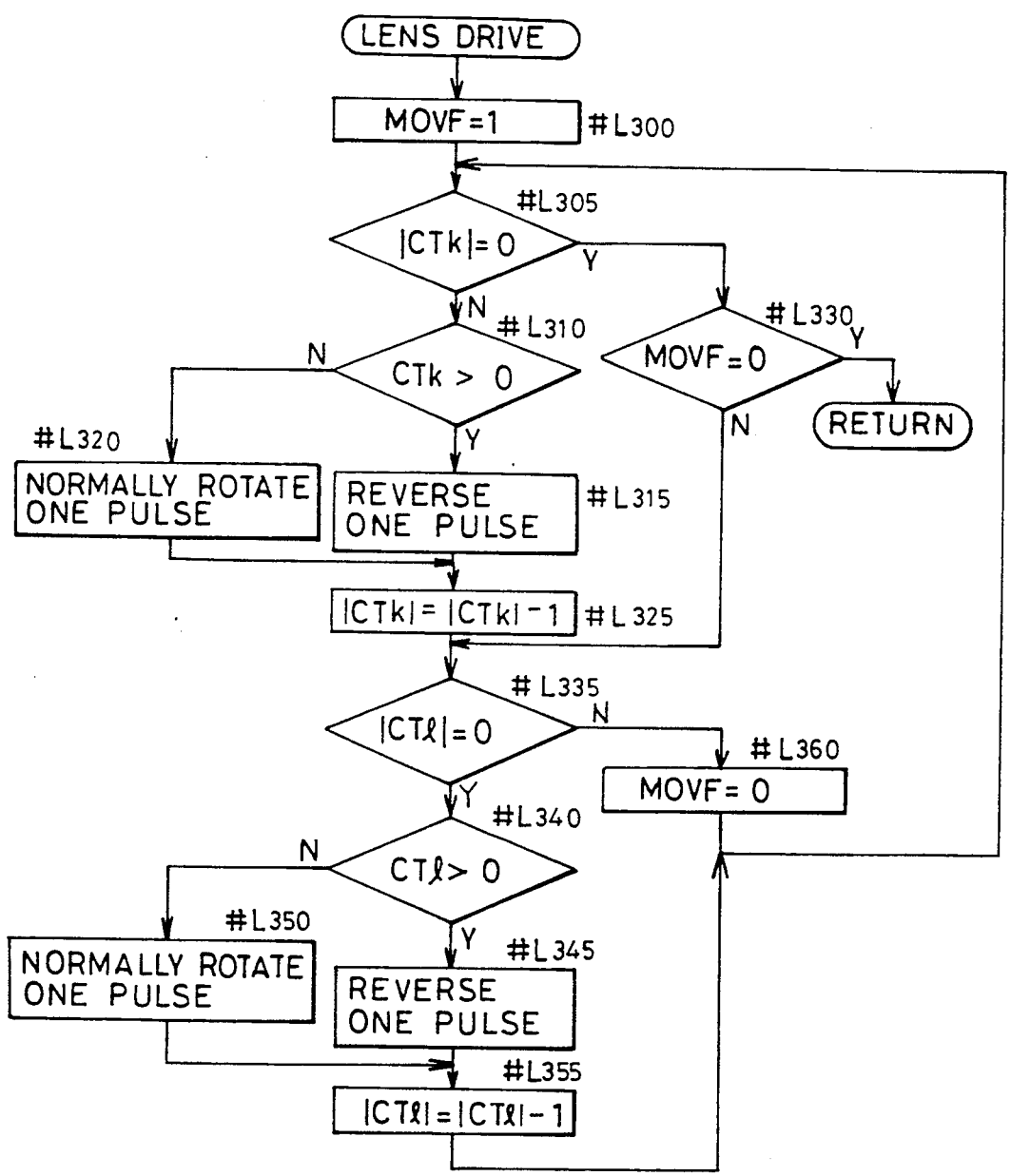
FIG. 32 is a flow chart showing the detailed contents of a routine of lens drive II of FIG. 28.

From #L230 to #L250, microcomputer μC3 determines whether the absolute value |ΔNl| of the amount of lens drive in the l direction is 0. If the absolute value is not 0, it determines whether ΔNl is positive. If this value is positive, microcomputer μC3 outputs one drive pulse in the direction of normal rotation, but if not, outputs one drive pulse in the direction of reverse rotation, and then subtracts 1 from |ΔNl| to obtain a new absolute value |ΔNl|. If the absolute value |ΔNl| is 0 in #L230, microcomputer μC3 proceeds to #L260 with a determination that the lens drive in the l direction is completed, then resets flag MOVF indicating that the program is under lens drive in the l direction and then returns to #L205. It returns to #L205 also from #L250. Next, the contents of a subroutine of a lens drive II are shown in FIG. 32. First, microcomputer μC3 sets flag MOVF indicating that the program is under lens drive in the l direction in #L300. Then, it makes determination whether an absolute value |CTk| of a lens position in the k direction is 0. If the absolute value CTk is not 0, it determines whether CTk is positive. If this value is positive, microcomputer μC3 outputs one drive pulse in the direction of reverse rotation, but if not, outputs one drive pulse in the direction of normal rotation, and then subtracts 1 from |CTk| to obtain a new|CTk| (#L305-#L325). If absolute value |CTk| is 0 in #L305, microcomputer μC3 proceeds to #L330 with a determination that the lens position in the k direction returns to the initial position, and then makes determination whether flag MOVF indicating that the program is under lens drive in the l direction is reset. If flag MOVF is reset in #L330, microcomputer μC3 makes a return with a determination that a lens position in the l direction, which will be described later, also returns to the initial position. If flag MOVF is not reset, it proceeds to #L335. Microcomputer μC3 proceeds to #L335 also from #L325.

From #L335 to #L355, microcomputer μC3 makes determination whether an absolute value |CTl| of the lens position in the l direction is 0. If the absolute value is not 0, it determines whether CTl is positive. If this value is positive, microcomputer μC3 outputs one drive pulse in the direction of reverse rotation, but if not, outputs one drive pulse in the direction of normal rotation, and then subtracts 1 from |CTl| to obtain a new absolute value |CTl|. If this absolute value |CTl| is 0 in #L335, microcomputer μC3 proceeds to the #L360 with a determination that the lens position in the l direction returns to the initial position, then resets flag MOVF indicating that the program is under lens drive in the l direction and then returns to #L305. It returns to #L305 also from #L355. Accordingly, the camera-shake correction lens is driven in the opposite direction from and by the same amount as the case where the lens was driven to correct the camera-shake, so that the lens is reset at the initial position.

The foregoing descriptions have been directed to the control concerning the camera-shake detection and correction.

Returning to the flow of microcomputer μC1 of FIG. 4, after outputting data to camera-shake detecting apparatus BL by data communication I in #50, microcomputer μC1 outputs display data to a display control circuit DISPC by serial communication in #55. The display data includes a shutter speed TV, aperture value AV, photographing mode (normal mode, portrait photographing mode and scenery photographing mode), and the presence/absence of camera-shake. When a camera-shake is taking place, display control circuit DISPC performs a display control to flicker the display of shutter speed TV.

Figure 45:
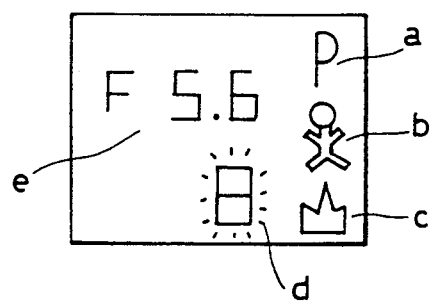
FIG. 45 is a diagram showing one example of a display portion according to one embodiment of the present invention.
Figure 46:
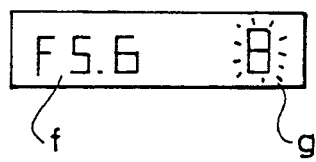
FIG. 46 is a diagram showing another example of the display portion according to one embodiment of the present invention.

The state of this display is shown in FIGS. 45 and 46. In the figures, the denotations a, b, and c designate the display of the photographing mode, designating the normal mode, portrait photographing mode and scenery photographing mode, respectively. Only a selected one of these modes is displayed. The denotations d and e designate the display of shutter speed and aperture value, respectively. The flickering of the shutter speed display d is warning that the camera-shake is taking place. The other denotations f and g designate the display of an aperture value and a shutter speed within the finder, respectively. The flickering of the shutter speed display g is warning that the camera-shake is taking place.

After the output of the display data in #55, microcomputer μC1 determines ON/OFF of release switch S2 in #60. When release switch S2 is OFF in #60, it determines whether preparatory switch S1 is ON in #130. When preparatory switch S1 is ON in #130, microcomputer μC1 executes the processings from #15. When release switch S2 is ON in #60, it determines whether the image is in-focus in #62. If the image is not in in-focus in #62, microcomputer μC1 executes the processings from #15. In case of the in-focus state in #62, microcomputer μC1 carries out a shutter release in #65 and then waits for the completion of mirror-up in #70. When the mirror-up completes, it executes a subroutine of exposure control in #75.

The contents of the subroutine of exposure control are shown in FIG. 6. When this subroutine is called, microcomputer μC1 first determines whether a flash photography is carried out. In case of the flash photography (FLF = 1), microcomputer μC1 causes a terminal FLOK to attain the high level and outputs data of film sensitivity SV to a D/A converter incorporated in microcomputer μC1 (#1300-#1302). Accordingly, the D/A converter converts the data of film sensitivity SV to an analog signal to output the same to a brightness adjusting circuit STC. This brightness adjusting circuit STC accumulates reflected light from a film surface in semi-synchronization with emission of flashlight and, when accumulating a predetermined amount of light, outputs an emission stop signal STP to flash circuit FLC.

Figure 39:
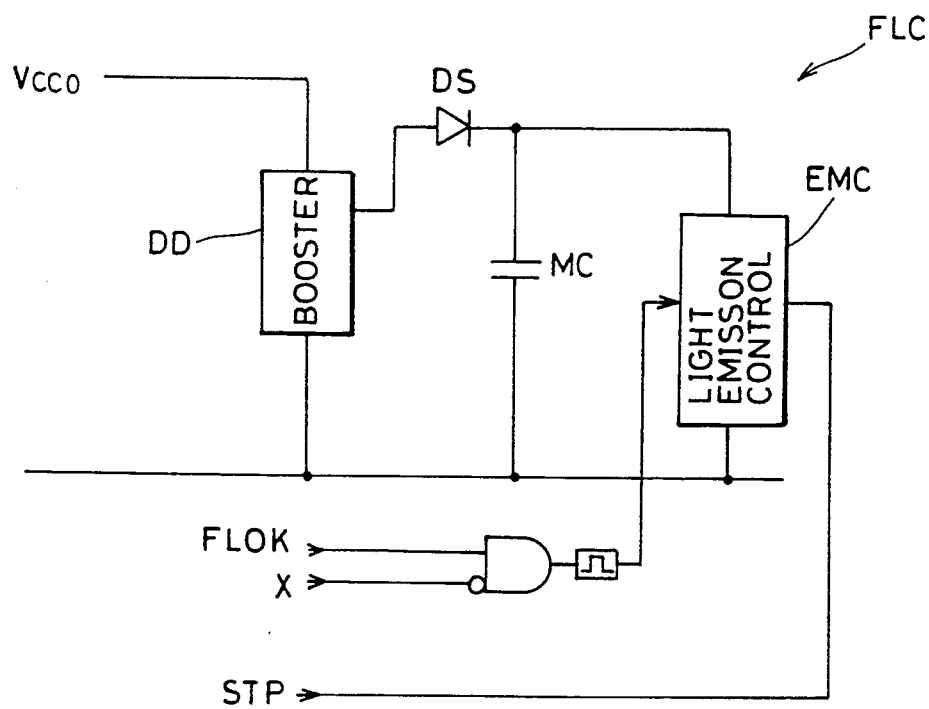
FIG. 39 is a circuit diagram of a flash circuit according to one embodiment of the present invention.

The configuration of flash circuit FLC is shown in FIG. 39. Referring to the figure, a boosting circuit DD including a DC/DC converter boosts a DC low voltage $V_{CCO}$ to a DC high voltage to store an energy into a condenser MC for storing a light emitting energy via a rectifying element DS. An emission control circuit EMC starts emitting flashlight in response to an AND signal of a signal (the high level of terminal FLOK) outputted in flash photography and an X signal which becomes an ON state after a preceding shutter curtain travels, and stops the emission in response to emission stop signal STP.

Figure 26:
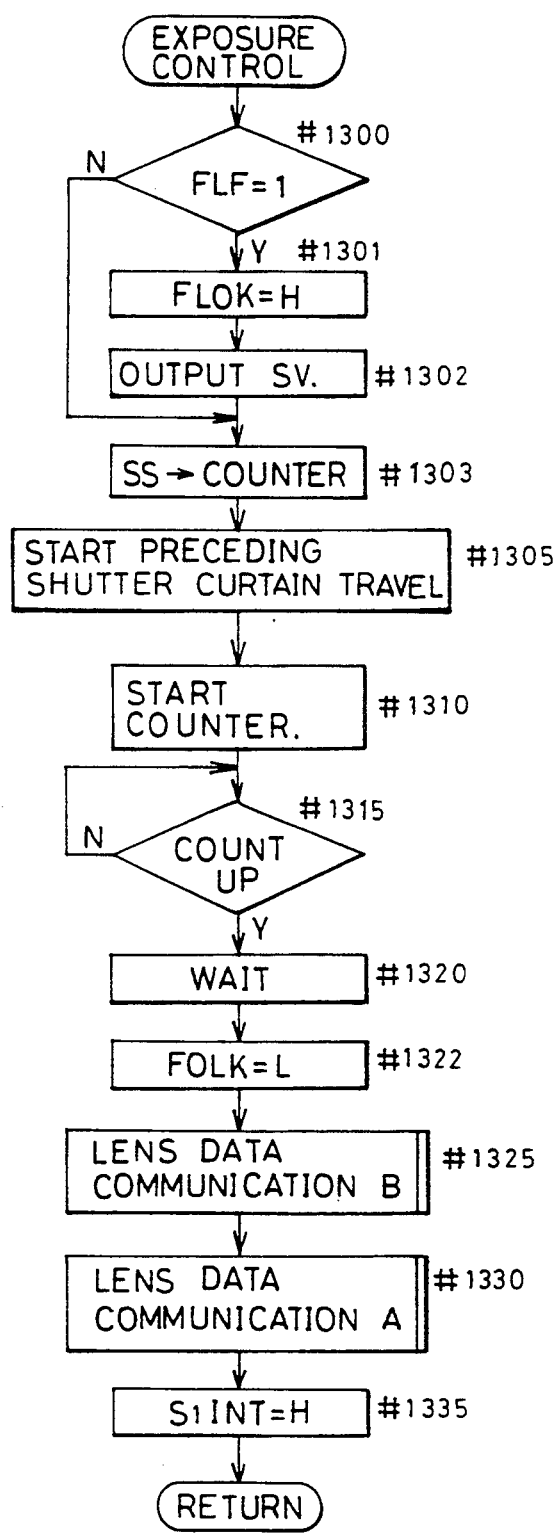
FIG. 26 is a flow chart showing the detailed contents of a routine of exposure control of FIG. 4.
Figure 27:
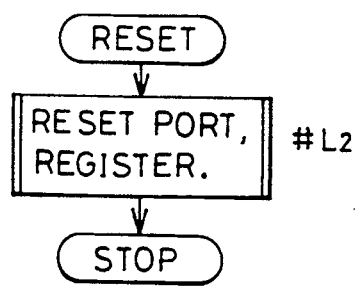
FIG. 27 is a flow chart showing the detailed contents of a reset routine according to one embodiment of the present invention.

Returning to the flow of FIG. 26, microcomputer μC1 proceeds to #1303 from #1302 or when the flash photography is not carried out in #1300. Then, it presets a count value corresponding to a shutter speed (exposure time) in an exposure-time counter, then stops to supply a power to an electric magnet for the preceding shutter curtain travel to starts the preceding shutter curtain travel and then start the exposure-time counter (#1303-#1310). Then, microcomputer μC1 waits for the exposure-time counter to end the counting. When the counter ends the counting, microcomputer μC1 is on standby for a definite time period. During a required time period from the start to the end of a trailing shutter curtain travel, it causes terminal FLOK to attain the low level and executes the subroutine of lens data communication B to inform in-lens circuit LE of the completion of exposure (#1315-#1325). At this time, a correction end signal is transmitted to the lens. Next, microcomputer μC1 executes the subroutine of lens data communication A to receive data of camera-shake determination (#1330). Then, it outputs a signal which changes from the low level to the high level to terminal SIINT of microcomputer μC2 in camera-shake detecting apparatus BL and then, through the process of camera-shake detection, makes a return (#1335).

Figure 38:
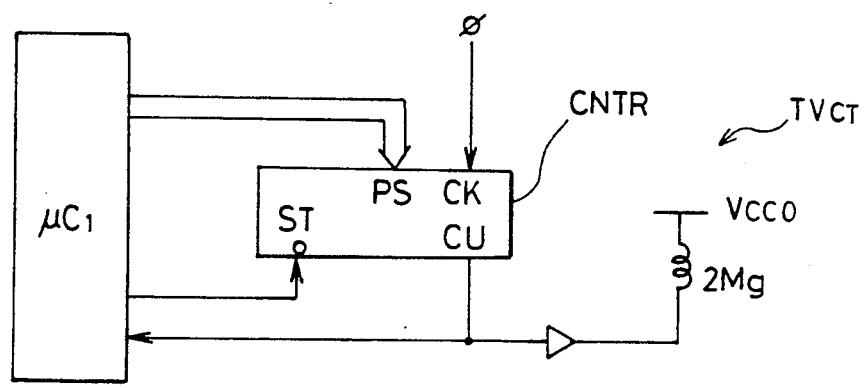
FIG. 38 is a circuit diagram of a shutter control circuit according to one embodiment of the present invention.

A circuit configuration for controlling exposure time is shown in FIG. 38. An exposure-time counter CNTR starts counting a clock φ inputted to a clock input terminal CK when a count value indicating exposure time is preset in a preset terminal PS by microcomputer μC1 and then a start signal is inputted to a terminal ST. When the count value of exposure-time counter CNTR reaches the above described preset value, a count-up signal is outputted from a terminal CU, and a power supply to a magnet 2 Mg for trailing shutter curtain travel is stopped, so that the trailing shutter curtain travels. The exposure time is controlled on a hardware basis here in order to carry out a control (a data communication with lens) due to an interruption which is made by camera-shake detecting apparatus BL under exposure.

After completing the execution of the subroutine of exposure control in #75 of FIG. 4, microcomputer μC1 carries out a control of one frame wind-up. After this one frame wind-up, microcomputer μC1 determines whether any camera-shake has occurred under exposure, based on data transmitted from the camera-shake correction lens. When the camera-shake correction lens is not mounted onto the camera, such determination is made based on the data from camera-shake detecting apparatus BL (#90). In case where the camera-shake has occurred, microcomputer μC1 sets warning display data in #95, while in case where no camera-shake has occurred, it sets warningless display data in #100. In both cases, microcomputer μC1 outputs the display data to display control circuit DISPC in #102 to cause the display control circuit to display the data. Next, determination is made whether preparatory switch S1 is ON in #105. When preparatory switch S1 is ON in #105, microcomputer μC1 proceeds to #90. When preparatory switch S1 is OFF in #105 or #130, microcomputer μC1 turns off transistors Tr1 and Tr2 to output display erase data to display control circuit DISPC thereby to cause the display control circuit to erase the display. Thereafter, microcomputer μC1 sets an OFF signal of microcomputer μC3 to execute the subroutine of lens data communication B, and then stops (#110-#125).

As has been described, according to the present invention, when the shutter speed calculated based on outputs of brightness measuring means in the flash photography is equal to or lower than a predetermined shutter speed which is lower than the flash synchronized maximal speed, a shutter speed for controlling is set to the predetermined shutter speed. This makes it possible to prevent a shutter speed in a slow shutter synchronized photography from being excessively decreased.

Provision of means for detecting and correcting the camera-shake makes it possible to set lower the lower limit value of the shutter speed in the slow shutter synchronized photography. In this case, when determination is made that the camera-shake correction is not effective, setting the shutter speed to the flash synchronized maximal speed can prevent the use of a slow shutter in case where the camera-shake can not be sufficiently carried out.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A camera having a blurring correction apparatus comprising:
    a photographic lens for forming an image of an object to be photographed;
    detecting means for detecting the degree of movement of the formed image of the object;
    correcting means operative at least during exposure time for correcting the position of the image of the object based on an output of said detecting means so as to compensate the movement of the image of the object;
    setting means for setting said exposure time;
    calculating means for calculating the amount of movement of the image of the object produced during said exposure time based on the output of said detecting means and said set exposure time; and prohibiting means for prohibiting an operation of said correcting means when the amount of movement of the image of the object produced during said exposure time is smaller than a predetermined value.

2. The camera according to claim 1, wherein
said detecting means includes moving speed detecting means for detecting the speed of the movement of the image of the object, and
said calculating means calculates the amount of movement of the image of the object produced during said exposure time based on said moving speed and said exposure time.

3. The camera according to claim 2, wherein
said detecting means includes first detecting means for detecting the position of the image of the object at a first time, second detecting means for detecting the position of the image of the object at a second time, a timer for counting a time period from said first time to said second time, and moving amount calculating means for calculating the amount of movement of the image of the object based on the image of the object at said first and second times and an output of said timer; and
said moving speed detecting means includes moving speed calculating means for calculating the speed of movement of the image of the object based on said calculated amount of movement and said output of said timer.

4. The camera according to claim 3, wherein
said correcting means corrects the position of the image of the object by the amount of movement calculated by said moving amount calculating means, wherein
said camera further comprises
determining means for determining that the correction is impossible when said calculated amount of movement is larger than a predetermined value, and warning means for warning in response to an output of said determining means determining that the correction is impossible.

5. The camera according to claim 2, further comprising:
determining means for determining that the correction is impossible when said detected moving speed of the image of the object is higher than a predetermined speed; and
warning means for warning in response to the output of said determining means determining that the correction is impossible.

6. The camera according to claim 1, wherein
said correcting means includes a correcting lens provided in said photographic lens and driving means for driving said correcting lens based on the output of said detecting means to correct the position of the image of the object.

7. The camera according to claim 1, wherein
said detecting means detects the degree of movement of the image of the object due to camera-shake.

8. The camera according to claim 1, further comprising:
switching means for switching a first mode in which the correction is not carried out by said correcting means and a second mode in which the correction is carried out by said correcting means;

exposure control means for carrying out exposure control in said set exposure time;
flash means for emitting flashlight upon exposure;
first limiting means for limiting said exposure time to be shorter than a first predetermined time period which is longer than a flash synchronized limit exposure time in said first mode; and
second limiting means for limiting said exposure time to be shorter than a second predetermined time period which is longer than said first predetermined time period in said second mode.

9. The camera according to claim 1, further comprising
exposure control means for carrying out exposure control in said set exposure time.

10. The camera according to claim 9, further comprising:
flash means for emitting flashlight toward the object upon exposure;
flash controlling means for controlling said flash means by selecting an emission mode for emitting flashlight upon exposure and a non-emission mode for prohibiting the emission of flashlight; and
emission changing means for changing to said emission mode when said set exposure time is longer than or equal to a predetermined time period and changing to said non-emission mode when said set exposure time is shorter than said predetermined time period.

11. A camera having a blurring correction apparatus, comprising:
a photographic lens for forming an image of an object to be photographed;
detecting means for detecting the degree of movement of the formed image of the object;
correcting means operative at least during exposure time for correcting the position of the image of the object based on an output of said detecting means, so as t compensate the movement of the image of the object;
determining means for determining, based on the output of said detecting means, as to whether the correction by said correcting means is possible; and
warning means for providing a warning, in response to an output of said determining means, which indicates only that the correction is not possible.

12. The camera according to claim 11, wherein
said detecting means includes moving speed detecting means for detecting the speed of movement of the image of the object, and
said determining means determines that the correction by said correcting means is impossible when said detected moving speed is higher than or equal to a predetermined speed, and determines that the correction by said correcting means is possible when said detected moving speed is lower than said predetermined speed.

13. The camera according to claim 12, wherein
said predetermined speed is a value corresponding to the amount by which the object is enabled to move in a predetermined time period.

14. The camera according to claim 11, wherein
said determining means includes intended-position calculating means for calculating an intended correction position of the image of the object based on the output of said detecting means, and intended-position determining means for determining whether said calculated intended correction position is within a correction enabling range, and determines based on a determination output of said intended-position determining means that the correction is possible when said intended correction position is within the correction enabling range and that the correction is impossible when said intended correction position is out of the correction enabling range.

15. The camera according to claim 14, wherein said correcting means includes a correcting lens provided in said photographic lens and driving means responsive to the detection output of said detecting means for driving said correcting lens, and said correction enabling range is a range for movement of the image of the object corresponding to a range for enabling the drive of said correction lens.

16. A camera having a blurring correction apparatus, comprising:

a photographic lens for forming an image of an object to be photographed;

detecting means for detecting movement of the formed image of the object;

correcting means operative at least during exposure time for correcting the position of the image of the object based on an output of said detecting means so as to compensate the movement of the image of the object;

switching means for switching a between first mode in which the correction is not carried out by said correcting means and a second mode in which the correction is carried out by said correcting means;

setting means for setting exposure time;

exposure control means for carrying out exposure in said set exposure time;

first limiting means for limiting said exposure time to be shorter than a first predetermined time period which is longer than a flash synchronized limit exposure time in said first mode; and second limiting means for limiting said exposure time to be shorter than a second predetermined time period which is longer than said first predetermined time period in said second mode.

17. A camera mountable with an interchangeable lens having correcting means responsive to a signal from said camera for moving the position of an image of an object to be photographed, comprising:

a photographic lens for forming the image of the object;

detecting means for detecting movement of the formed image of the object;

signal outputting means responsive to a detection output of said detecting means for outputting a signal to said correcting means in an interchangeable lens;

determining means for determining whether the mounted interchangeable lens has said correction means;

setting means for setting exposure time;

exposure control means for carrying out exposure in said set exposure time;

first limiting means for limiting said exposure time to be shorter than a first predetermined time period which is longer than a flash synchronized limit exposure time in response to an output of said determining means determining that the interchangeable lens does not have said correcting means; and second limiting means for limiting said exposure time to be shorter than a second predetermined time period which is longer than said first predetermined time period in response to the output of said determining means determining that the interchangeable lens does not have said correcting means.

18. The camera according to claim 17, wherein said exposure control means includes brightness measuring means for measuring color temperature of surrounding light and altering means for altering the ratio of the amount of exposure by flashlight to the amount of exposure by surrounding light based on said measured color temperature.

19. A camera having a blurring correction apparatus, comprising:

a photographic lens for forming an image of an object to be photographed;

detecting means for detecting movement of the formed image of the object;

correcting means operative at least during exposure time for correcting the position of the image of the object based on an output of said detecting means so as to compensate the movement of the image of the object;

means for setting exposure time;

exposure control means for carrying out exposure in said set exposure time; and limiting means for limiting said exposure time to be shorter than a predetermined time period which is longer than a flash synchronized limit exposure time.

20. A camera having a blurring correction apparatus, a photographic lens for forming an image of an object to be photographed;

detecting means for detecting movement of the formed image of the object;

correcting means operative at least during exposure time for correcting the position of the image of the object based on an output of said detecting means so as to compensate the movement of the image of the object;

switching means for switching a first mode in which the correction is not carried out by said correcting means and a second mode in which the correction is carried out by said correcting means;

flash means for emitting flashlight toward the object upon exposure;

flash controlling means for controlling said flash means by selecting an emission mode for emitting flash light upon exposure and a non-emission mode for prohibiting the emission of flashlight;

setting means for setting exposure time; and emission changing means for, in said first mode, changing to said emission mode when said set exposure time is longer than or equal to a first predetermined time period and changing to said non-emission mode when said set exposure time is shorter than said first predetermined time period, and in said second mode, changing to said emission mode when said set exposure time is longer than or equal to a second predetermined time period which is longer than said first predetermined time period and changing to said non-emission mode when said set exposure time is shorter than said second predetermined time period.

21. A camera mountable with an interchangeable lens having correcting means responsive to a signal from said camera for moving the position of an image of an object to be photographed, comprising:

a photographic lens for forming the image of the object;

detecting means for detecting movement of the formed image of the object;

signal outputting means responsive to an output of said detecting means for outputting a signal to said correcting means in the interchangeable lens;

determining means for determining whether the mounted interchangeable lens has said correcting means;

setting means for setting exposure time;

exposure control means for carrying out exposure in said set exposure time;

flash means for emitting flashlight upon exposure;

flash controlling means for controlling said flash means by selecting an emission mode for emitting flashlight upon exposure and a non-emission mode for prohibiting the emission of flashlight; and emission changing means responsive to an output of said determining means determining that the interchangeable lens does not have said correcting means for changing to said emission mode when said set exposure time is longer than or equal to a first predetermined time period and changing to said non-emission mode when said set exposure time is shorter than said first predetermined time period, and responsive to an output of said determining means determining that the interchangeable lens has said correction means for changing to said emission mode when said set exposure time is longer than or equal to a second predetermined time period which is longer than said first predetermined time period and changing to said non-emission mode when said set exposure time is shorter than said second predetermined time period.

22. A camera having a blurring correction apparatus, comprising:

exposure control means for exposing a film by receiving light from an object to be photographed;

flash means for emitting flashlight;

flash controlling means for controlling said flash means to emit flashlight during exposure;

brightness measuring means for measuring color temperature of surrounding light of the object; and altering means for altering the ratio of the amount of exposure by the flashlight to the amount of exposure by the surrounding light based on said measured color temperature.

23. A camera system including a camera body and an interchangeable lens mounted on said camera body, wherein said camera body includes detecting means for detecting the movement of an image of an object to be photographed, formed by said lens, and outputting means for outputting data as to the movement detected by said detecting means; and said lens includes inputting means for inputting the data output from said outputting means, and outputting means for correcting the position of the image of the object on the basis of said input data.

24. The camera system according to claim 23, wherein said correcting means includes a correction lens for shifting the position of the image of the object, calculating means for calculating data for driving said correction lens on the basis of said input data, and driving means for driving said correction lens in accordance with said calculated data.

25. The camera system according to claim 23, wherein said lens further includes determining means for determining whether or not the correction by said correcting means can be made, on the basis of said input data.

26. A camera having a blurring correction apparatus, comprising:

a photographic lens for forming an image of an object to be photographed;

detecting means for detecting the movement of the image of the object;

a correction lens for shifting the position of the formed image of the object;

driving means for driving said correction lens in accordance with an output of said detecting means;

exposure control means for controlling exposure; and initializing means for setting said correction lens in an initial position in response to termination of operation of said exposure control means.

27. A camera having a blurring correction apparatus, comprising:

a photographic lens for forming an image of an object to be photographed;

detecting means for detecting of the formed image of the object;

correcting means operative at least during exposure time for correcting the position of the image of the object on the basis of an output of said detecting means so as to compensate the movement of the image of the object;

switching means for switching a first mode in which the correction is not carried out by said correcting mans and a second mode in which the correction is carried out by said correcting means;

flash means for emitting flashlight toward the object upon exposure;

flash controlling means for controlling said flash means by selecting an emission mode for emitting flash light upon exposure and a non-emission mode for prohibiting the emission of flashlight;

brightness measuring means for measuring brightness of the object; and emission mode selecting means for selecting said non-emission mode if the measured brightness of the object is higher than a first predetermined value and selecting said emission mode if the measured brightness of the object is lower than said first predetermined value in said first mode, and for selecting said non-emission mode if the measured brightness of the object is higher than a second predetermined value lower than said first predetermined value and selecting said emission mode if the measured brightness is lower than said second predetermined value in said second mode.

28. The camera according to claim 20, further comprising brightness measuring means for measuring brightness of the object; wherein said setting means sets exposure time according to said measured brightness of the object.

29. A camera having a blurring correction apparatus, comprising:

a photographic lens for forming an image of an object to be photographed;

detecting means for detecting the degree of movement of the formed image of the object;

correcting means operative at least during exposure time for correcting the position of the image of the object based on an output of said detecting means so as to compensate for movement of the image of the object;

manual switching means for manually switching between a first operating mode in which the correction is not carried out by said correcting means and a second operating mode in which the correction is carried out by said correcting means, in accordance with a camera user's intentions;

exposure controlling means for carrying out exposure in a first exposure mode or a second exposure mode; and selecting means for selecting the first exposure mode in the first operating mode and for selecting the second exposure mode in the second operating mode.

30. The camera according to claim 29, wherein the exposure controlling means includes setting means for setting exposure time, and limiting means for limiting the exposure time to be shorter than a first predetermined time period in the first operating mode and for limiting the exposure time to be shorter than a second predetermined time period which is longer than the first predetermined time period in the second operating mode.

31. A camera mountable with an interchangeable lens having correcting means responsive to a signal from said camera for moving the position of an image of an object to be photographed, comprising a photographic lens for forming the image of the object;

detecting means for detecting the degree of movement of the formed image of the object;

signal outputting means responsive to a detection output of said detecting means for outputting a signal to said correcting means in an interchangeable lens;

determining means for determining whether an interchangeable lens mounted on the camera has said correcting means;

exposure controlling means for carrying out exposure in a first exposure mode or a second exposure mode; and selecting means for selecting the first exposure mode when said determining means determines that the mounted interchangeable lens does not have said correcting mans and for selecting the second mode when said determining means determines that the mounted interchangeable lens has said correcting means.

32. The camera according to claim 31, wherein the exposure controlling means includes setting means for setting exposure time, and limiting means for limiting the exposure time to be shorter than a first predetermined time period in the first exposure mode and for limiting the exposure time to be shorter than a second predetermined time period which is longer than the first predetermined time period in the second exposure mode.

33. A camera having a blurring correction apparatus comprising:

a photographic lens for forming an image of an object to be photographed;

detecting means for detecting the degree of shaking of the camera;

correcting mans operative at least during exposure time for correcting the position of the image of the object based on an output of said detecting means so as to compensate for movement of the image of the object caused by shaking of the camera;

setting means for setting said exposure time;

calculating means for calculating the amount of movement of the image of the object produced during said exposure time based on the output of said detecting means and said set exposure time; and prohibiting means for prohibiting operation of said correcting means when the amount of movement of the image of the object produced during said exposure time is smaller than a predetermined value.

34. The camera of claim 33 wherein said detecting means detects the degree of shaking of the camera by detecting the degree of movement of the formed image of the object.

35. A camera having a blurring correction apparatus, comprising:

a photographic lens for forming an image of an object to be photographed;

detecting means for detecting the degree of shaking of the camera;

correcting means operative at least during exposure time for correcting the position of the image of the object based on an output of said detecting means so as to compensate for movement of the image of the object caused by camera shaking;

determining means for determining, based on the output of said detecting mans, whether the correction by said correcting means is possible; and warning means responsive to an output of said determining means for warning only that the correction is not possible.

36. The camera of claim 35 wherein said detecting means detects the degree of shaking of the camera by detecting the degree of movement of the formed image of the object.

37. A camera having a blurring correction apparatus, comprising:

a photographic lens for forming an image of an object to be photographed;

detecting means for detecting shaking of the camera;

correcting means operative at least during exposure time for correcting the position of the image of the object based on an output of said detecting means so as to compensate for movement of the image of the object caused by camera shaking;

switching means for switching between a first mode in which the correction is not carried out by said correcting means and a second mode in which the correction is carried out by said correction means;

setting means for setting exposure time;

exposure control means for carrying out exposure in said set exposure time;

first limiting means for limiting said exposure time to be shorter than a first predetermined time period which is longer than a flash synchronized limit exposure time in said first mode; and second limiting means for limiting said exposure time to be shorter than a second predetermined time period which is longer than said first predetermined time period in said second mode.

38. The camera of claim 37 wherein said detecting means detects shaking of the camera by detecting movement of the formed image of the object.

39. A camera mountable with an interchangeable lens having correcting means responsive to a signal from said camera for moving the position of an image of an object to be photographed, comprising:

a photographic lens for forming the image of the object;

detecting means for detecting shaking of the camera;

signal outputting means responsive to a detection output of said detecting means for outputting a signal to said correcting means in an interchangeable lens;

determining means for determining whether an interchangeable lens mounted on the camera has said correcting means;

setting means for setting exposure time;

exposure control means for carrying out exposure in said set exposure time;

flash means for emitting flash light upon exposure;

first limiting means for limiting said exposure time to be shorter than a first predetermined time period which is longer than a flash synchronized limit exposure time in response to an output of said determining means determining that the mounted interchangeable lens does not have said correcting means; and second limiting means for limiting said exposure time to be shorter than a second predetermined time period which is longer than said first predetermined time period in response to the output of said determining means determining that the mounted interchangeable lens does not have said correcting means.

40. The camera of claim 39 wherein said detecting means detects shaking of the camera by detecting movement of the formed image of the object.

41. A camera having a blurring correction apparatus, comprising:

a photographic lens for forming an image of an object to be photographed;

detecting means for detecting shaking of the camera;

correcting means operative at least during exposure time for correcting the position of the image of the object based on an output of said detecting means so as to compensate for movement of the image of the object caused by shaking of the camera;

setting means for setting exposure time;

exposure control means for carrying out exposure in said set exposure time;

limiting means for limiting said exposure time to be shorter than a predetermined time period which is longer than a flash synchronized limit exposure time.

42. The camera of claim 41 wherein said detecting means detects shaking of the camera by detecting movement of the formed image of the object.

43. A camera having a blurring correction apparatus, comprising:

a photographic lens for forming an image of an object to be photographed;

detecting means for detecting shaking of the camera;

correcting means operative at least during exposure time for correcting the position of the image of the object based on an output of said detecting means so as to compensate for movement of the image of the object caused by shaking of the camera;

switching means for switching between a first mode in which the correction is not carried out by said correcting means and a second mode in which the correction is carried out by said correcting means;

flash means for emitting flash light toward the object upon exposure;

flash controlling means for controlling said flash means by selecting an emission mode for emitting flash light upon exposure and a non-emission mode for prohibiting the emission of flash light;

setting means for setting exposure time; and emission changing means for, in said first mode, changing to said emission mode when said set exposure time is longer than or equal to a first predetermined time period and changing to said non-emission mode when said set exposure time is shorter than said first predetermined time period, and in said second mode, changing to said emission mode when said set exposure time is longer than or equal to a second predetermined time period which is longer than said first predetermined time period and changing to said non-emission mode when said set exposure time is shorter than said second predetermined time period.

44. The camera of claim 43 wherein said detecting means detects shaking of the camera by detecting movement of the formed image of the object.

45. A camera mountable with an interchangeable lens having correcting means responsive to a signal from said camera for moving the position of an image of an object to be photographed, comprising:

a photographic lens for forming the image of the object;

detecting means for detecting shaking of the camera;

signal outputting means responsive to an output of said detecting means for outputting a signal to said correcting means in an interchangeable lens;

determining means for determining whether an interchangeable lens mounted on the camera has said correcting means;

setting mans for setting exposure time;

exposure control means for carrying out exposure in said set exposure time;

flash means for emitting flash light upon exposure;

flash controlling means for controlling said flash means by selecting an emission mode for emitting flash light upon exposure and a non-emission mode for prohibiting the emission of flash light; and emission changing means responsive to an output of said determining means determining that the mounted interchangeable lens does not have said correcting means for changing to said emission mode when said set exposure time is longer tan or equal to a first predetermined time period and changing to said non-emission mode when said set exposure time is shorter than said first predetermined time period, and responsive to an output of said determining means determining that the mounted interchangeable lens has said correction means for changing to said emission mode when said set exposure time is longer than or equal to a second predetermined time period which is longer than said first predetermined time period and changing to said non-emission mode when said set exposure time is shorter than said second predetermined time period.

46. The camera of claim 45 wherein said detecting means detects shaking of the camera by detecting movement of the formed image of the object.

47. A camera system including a camera body and an interchangeable lens mounted on said camera body, wherein said camera body includes
  detecting means for detecting shaking of the camera, and
  outputting means for outputting data as to the shaking of the camera detected by said detecting means; and
said lens includes
  inputting means for inputting the data output from said outputting means, and
  correcting means for varying the position of the image of the object on the basis of said input data.

48. The camera of claim 47 wherein said detecting means detects shaking of the camera by detecting movement of the formed image of the object.

49. A camera having a blurring correction apparatus, comprising:
  a photographic lens for forming an image of an object to be photographed;
  detecting means for detecting shaking of the camera;
  a correction lens for shifting the position of the formed image of the object;
  driving means for driving said correction lens in accordance with an output of said detecting means;
  exposure control means for controlling exposure; and
  initializing means for setting said correction lens in an initial position in response to termination of operation of said exposure control means.

50. The camera of claim 49 wherein said detecting means detects shaking of the camera by detecting movement of the formed image of the object.

51. A camera having a blurring correction apparatus, comprising:
  a photographic lens for forming an image of an object to be photographed;
  detecting means for detecting shaking of the camera;
  correcting means operative at least during exposure time for correcting the position of the image of the object on the basis of an output of said detecting means so as to compensate for movement of the image of the object cased by shaking of the camera;
  switching means for switching between a first mode in which the correction is not carried out by said correcting means and a second mode in which the correction is carried out by said correcting means;
  flash means for emitting flash light toward the object upon exposure;
  flash controlling means for controlling said flash means by selecting an emission mode for emitting flash light upon exposure and a non-emission mode for prohibiting the emission of flash light;
  brightness measuring means for measuring brightness of the object; and
  emission mode selecting means for selecting said non-emission mode if the measured brightness of the object is higher than a firs predetermined value and selecting said emission mode if the measured brightness of the object is lower than said first predetermined value in said first mode, and for selecting said non-emission mode if the measured brightness of the object is higher than a second predetermined value lower than said first predetermined value and selecting said emission mode if the measured brightness is lower than said second predetermined value in said second mode.

52. The camera of claim 51 wherein said detecting means detects shaking of the camera by detecting movement of the formed image of the object.

53. A camera having a blurring correction apparatus, comprising:
  a photographic lens for forming an image of an object to be photographed;
  detecting means for detecting shaking of the camera;
  correcting means operative at least during exposure time for correcting the position of the image of the object based on an output of said detecting means so as to compensate for movement of the image of the object caused by shaking of the camera;
  manual switching means for manually switching between a first operating mode in which the correction is not carried out by said correcting means and a second operating mode in which the correction is carried out by said correcting means, in accordance with a camera user's intentions;
  exposure controlling means or carrying out exposure in a first exposure mode or a second exposure mode; and
  selecting means for selecting the first exposure mode in the first operating mode and for selecting the second exposure mode in the second operating mode.

54. The camera of claim 53 wherein said detecting means detects shaking of the camera by detecting movement of the formed image of the object.

55. A camera mountable with an interchangeable lens having correcting means responsive to a signal from said camera for moving the position of an image of an object to be photographed, comprising:
  a photographic lens for forming the image of the object;
  detecting means for detecting shaking of the camera;
  signal outputting means responsive to a detection output of said detecting means or outputting a signal to said correcting means in an interchangeable lens;
  determining means for determining whether an interchangeable lens mounted on the camera has said correcting means;
  exposure controlling means for carrying out exposure in a first exposure mode or a second exposure mode; and
  selecting means for selecting the first exposure mode when said determining means determines that the mounted interchangeable lens does not have said correcting means and for selecting the second mode when said determining means determines that the mounted interchangeable lens has said correcting means.

56. The camera of claim 55 wherein said detecting means detects shaking of the camera by detecting movement of the formed image of the object.

* * * * *